(12) United States Patent
Bono et al.

(10) Patent No.: US 11,741,056 B2
(45) Date of Patent: Aug. 29, 2023

(54) METHODS AND SYSTEMS FOR ALLOCATING FREE SPACE IN A SPARSE FILE SYSTEM

(71) Applicant: EMC IP Holding Company LLC, Hopkinton, MA (US)

(72) Inventors: Jean-Pierre Bono, Westboro, MA (US); Marc A. De Souter, Wayne, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 16/672,268

(22) Filed: Nov. 1, 2019

(65) Prior Publication Data

US 2021/0133159 A1 May 6, 2021

(51) Int. Cl.
   *G06F 16/188* (2019.01)
   *G06F 16/174* (2019.01)
   *G06F 16/17* (2019.01)

(52) U.S. Cl.
   CPC ........ *G06F 16/192* (2019.01); *G06F 16/1727* (2019.01); *G06F 16/1744* (2019.01)

(58) Field of Classification Search
   CPC . G06F 16/192; G06F 16/1727; G06F 16/1744
   See application file for complete search history.

(56) References Cited

U.S. PATENT DOCUMENTS

| | | |
|---|---|---|
| 5,394,537 A | 2/1995 | Courts et al. |
| 6,370,618 B1 | 4/2002 | Arimilli |
| 6,920,110 B2 | 7/2005 | Roberts |
| 8,312,242 B2 * | 11/2012 | Casper ............... G06F 16/10 711/170 |
| 8,407,265 B1 * | 3/2013 | Scheer ............... G06F 16/1727 711/170 |
| 8,429,360 B1 | 4/2013 | Iyer et al. |
| 8,566,673 B2 | 10/2013 | Kidney et al. |
| 8,924,684 B1 | 12/2014 | Vincent |
| 9,069,553 B2 | 6/2015 | Zaarur et al. |
| 9,104,321 B2 | 8/2015 | Cudak et al. |
| 9,172,640 B2 | 10/2015 | Vincent et al. |
| 9,250,953 B2 | 2/2016 | Kipp |
| 9,300,578 B2 | 3/2016 | Chudgar et al. |

(Continued)

FOREIGN PATENT DOCUMENTS

| | | |
|---|---|---|
| WO | 2016196766 A2 | 12/2016 |
| WO | 2017079247 A1 | 5/2017 |

OTHER PUBLICATIONS

Dr. Amit Golander, NetApp; "ZUFS—How to develop an efficient PM-based file system in user space"; SNIA Storage Development Conference EMEA; Feb. 2018.

(Continued)

*Primary Examiner* — Pierre M Vital
*Assistant Examiner* — Andrew N Ho
(74) *Attorney, Agent, or Firm* — Chamberlain, Hrdlicka, White, Williams & Aughtry

(57) ABSTRACT

A method for processing requests includes receiving a request to write data, in response to the request, identifying a sparse virtual space segment using an available space tracking metadata hierarchy, and initiating writing of the data to a physical segment, wherein the physical segment is associated with the sparse virtual space segment.

10 Claims, 19 Drawing Sheets

(56) References Cited

U.S. PATENT DOCUMENTS

| | | |
|---|---|---|
| 9,330,103 B1 | 5/2016 | Bono et al. |
| 9,443,095 B2 | 9/2016 | Lähteenmäki |
| 9,483,369 B2 | 11/2016 | Sporel |
| 9,485,310 B1 | 11/2016 | Bono et al. |
| 9,501,419 B2 | 11/2016 | Rastogi |
| 9,760,393 B2 | 9/2017 | Hiltgen et al. |
| 9,779,015 B1 | 10/2017 | Oikarinen et al. |
| 10,031,693 B1 | 7/2018 | Bansode et al. |
| 10,156,993 B1 * | 12/2018 | Armangau ............ G06F 3/0608 |
| 10,209,899 B2 | 2/2019 | Oshins et al. |
| 10,346,297 B1 | 7/2019 | Wallace |
| 10,348,813 B2 | 7/2019 | Abali et al. |
| 10,649,867 B2 | 5/2020 | Roberts et al. |
| 2003/0074486 A1 | 4/2003 | Anastasiadis et al. |
| 2004/0062245 A1 | 4/2004 | Sharp et al. |
| 2004/0172073 A1 | 9/2004 | Busch et al. |
| 2004/0210761 A1 | 10/2004 | Eldar et al. |
| 2005/0114557 A1 | 5/2005 | Arai et al. |
| 2005/0172097 A1 | 8/2005 | Voigt et al. |
| 2006/0101081 A1 | 5/2006 | Lin et al. |
| 2006/0200858 A1 | 9/2006 | Zimmer et al. |
| 2007/0245006 A1 | 10/2007 | Lehikoinen et al. |
| 2008/0154985 A1 | 6/2008 | Childs et al. |
| 2008/0270461 A1 * | 10/2008 | Gordon ................ G06F 3/0667 |
| 2009/0144416 A1 | 6/2009 | Chatley et al. |
| 2009/0248957 A1 | 10/2009 | Tzeng |
| 2009/0287902 A1 | 11/2009 | Fullerton |
| 2009/0300302 A1 | 12/2009 | Vaghani |
| 2009/0307538 A1 | 12/2009 | Hernandez et al. |
| 2009/0313415 A1 | 12/2009 | Sabaa et al. |
| 2010/0076933 A1 | 3/2010 | Hamilton et al. |
| 2010/0115009 A1 * | 5/2010 | Callahan ................ G06F 16/10 707/825 |
| 2010/0235832 A1 * | 9/2010 | Rajagopal ............. G06F 3/0665 718/1 |
| 2010/0274772 A1 * | 10/2010 | Samuels ............... G06F 16/188 707/693 |
| 2011/0161281 A1 | 6/2011 | Sayyaparaju et al. |
| 2011/0289519 A1 | 11/2011 | Frost |
| 2011/0314246 A1 * | 12/2011 | Miller ................... G06F 3/0631 711/170 |
| 2012/0096059 A1 * | 4/2012 | Shimizu .............. G06F 16/1727 707/828 |
| 2012/0250682 A1 | 10/2012 | Vincent et al. |
| 2012/0250686 A1 | 10/2012 | Vincent et al. |
| 2013/0111136 A1 | 5/2013 | Bell, Jr. |
| 2013/0111146 A1 | 5/2013 | Ash |
| 2013/0227236 A1 * | 8/2013 | Flynn ..................... G06F 3/061 711/165 |
| 2014/0089619 A1 | 3/2014 | Khanna et al. |
| 2014/0188953 A1 | 7/2014 | Lin et al. |
| 2014/0195564 A1 | 7/2014 | Talagala et al. |
| 2014/0279859 A1 * | 9/2014 | Benjamin-Deckert ...................... G06F 16/2365 707/609 |
| 2015/0212909 A1 | 7/2015 | Sporel |
| 2016/0117254 A1 * | 4/2016 | Susarla ............... G06F 12/0842 711/119 |
| 2016/0224244 A1 | 8/2016 | Gensler, Jr. et al. |
| 2017/0075812 A1 | 3/2017 | Wu |
| 2017/0131920 A1 | 5/2017 | Oshins et al. |
| 2017/0132163 A1 | 5/2017 | Aslot et al. |
| 2017/0169233 A1 | 6/2017 | Hsu et al. |
| 2017/0286153 A1 | 10/2017 | Bak et al. |
| 2018/0032249 A1 | 2/2018 | Makhervaks et al. |
| 2018/0095915 A1 | 4/2018 | Prabhakar et al. |
| 2019/0044946 A1 | 2/2019 | Hwang et al. |
| 2019/0251275 A1 * | 8/2019 | Ramrakhyani ..... G06F 21/6218 |
| 2019/0347204 A1 | 11/2019 | Du et al. |
| 2019/0377892 A1 | 12/2019 | Ben Dayan et al. |
| 2020/0241805 A1 | 7/2020 | Armangau et al. |
| 2021/0026774 A1 | 1/2021 | Lim |
| 2022/0035714 A1 | 2/2022 | Schultz et al. |

OTHER PUBLICATIONS

Dr. Amit Golander, NetApp; "ZUFS—Simplifying the Development of PM-Based File Systems"; SNIA Persistent Memory Summit 2018; Jan. 24, 2018.

Shachar Sharon (NetApp); "ZUFS Overview—Developing PMEM-based File-System in User-Space"; Persistent Programming In Real Life(PIRL'19), University of California, San Diego; Jul. 22, 2019; https://pirl.nvsl.io/program/.

International Search Report and Written Opinion issued in corresponding Application No. PCT/US2021/030138, dated Jan. 21, 2022 (16 pages).

International Search Report and Written Opinion issued in corresponding Application No. PCT/US2021/030141 dated Jan. 4, 2022 (11 pages).

Metz Joachim, "Hierarchical File System (HFS)" Nov. 4, 2020, Retrieved from the Internet on Dec. 16, 2021 https://github.com/libyal/libfshfs/blob/c52bf4a36bca067510d0672ccce6d449a5a85744/documentation/Hierarchical%20System%20 (HFS) .asciidoc.

Y. Yamato, Proposal of Automatic GPU Offloading Method from Various Language ApplicationsProposal of Automatic GPU Offloading Method from Various Language Applications, Proposal of Automatic GPU Offloading Method from Various Language Applications, 2021, pp. 400-404, 10.1109/ICIET51873.2021.9419618 (5 pages).

* cited by examiner

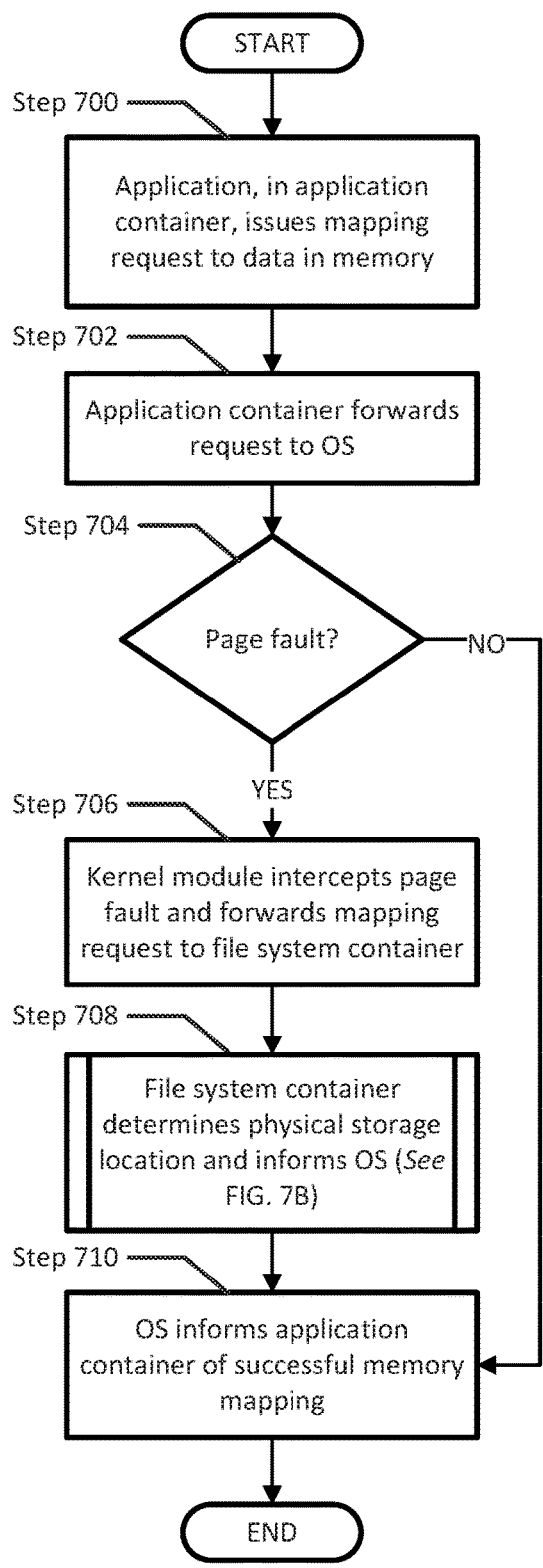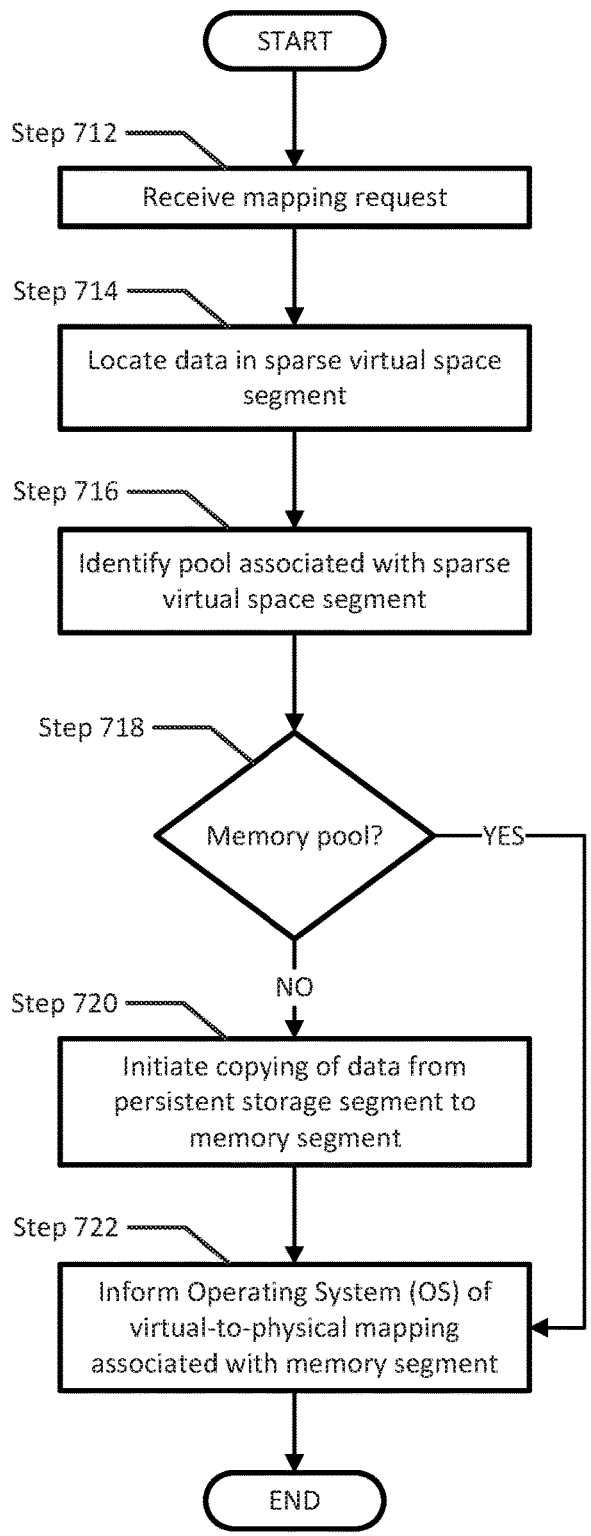
FIG. 7A
FIG. 7B

METHODS AND SYSTEMS FOR ALLOCATING FREE SPACE IN A SPARSE FILE SYSTEM

BACKGROUND

Devices and/or components of devices are often capable of performing certain functionalities that other devices and/or components are not configured to perform and/or are not capable of performing. In such scenarios, it may be desirable to adapt one or more system to enhance the functionalities of devices and/or components that cannot perform the one or more functionalities.

SUMMARY

In general, in one aspect, the invention relates to a method for processing requests. The method includes receiving a request to write data, in response to the request, identifying a sparse virtual space segment using an available space tracking metadata hierarchy, and initiating writing of the data to a physical segment, wherein the physical segment is associated with the sparse virtual space segment.

In general, in one aspect, the invention relates to a non-transitory computer readable medium that includes instructions which, when executed by a computer processor, enables the computer processor to perform a method for processing requests. The method includes receiving a request to write data, in response to the request, identifying a sparse virtual space segment using an available space tracking metadata hierarchy, and initiating writing of the data to a physical segment, wherein the physical segment is associated with the sparse virtual space segment.

Other aspects of the invention will be apparent from the following description and the appended claims.

BRIEF DESCRIPTION OF DRAWINGS

FIG. 7A shows a flowchart of a method of generating and servicing a read request in accordance with one or more embodiments of the invention.

FIG. 7B shows a flowchart of a method of servicing a mapping request in accordance with one or more embodiments of the invention.

DETAILED DESCRIPTION

Figure 1:
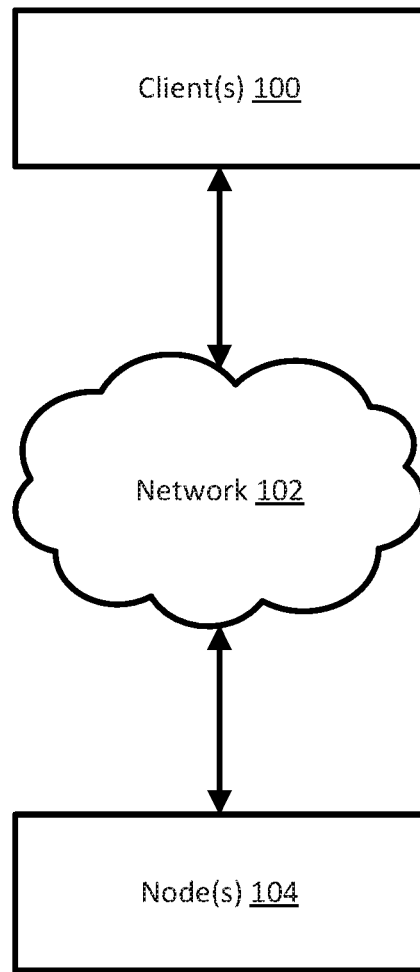
FIG. 1 shows a diagram of a system in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to systems, devices, and methods for implementing and leveraging persistent memory to improve performance of data requests. More specifically, embodiments of the invention relate to a data management service that identifies, intercepts, and redirects requests to appropriate physical devices to optimize utilization of components of the system. Further, embodiments of the invention are directed to allowing for direct manipulation of persistent memory.

Embodiments of the invention described herein allow for, at least, implementing and intelligently leveraging memory to enhance performance. While the invention has been described with respect to a limited number of embodiments and examples, those skilled in the art, having benefit of this detailed description, would appreciate that other embodiments can be devised which do not depart from the scope of the invention as disclosed herein. Accordingly, the scope of the invention should be limited only by the attached claims.

FIG. 1 shows a diagram of a system in accordance with one or more embodiments of the invention. The system includes one or more client(s) (100), operatively connected to a network (102), which is operatively connected to one or more node(s) (104). The components illustrated in FIG. 1 may be connected via any number of operable connections supported by any combination of wired and/or wireless networks (e.g., network (102)). Each component of the system of FIG. 1 is discussed below.

In one embodiment of the invention, client(s) (100) are configured to issue requests to the node(s) (104) (or to a specific node of the node(s) (104)), to receive responses, and to generally interact with the various components of a node (described below).

In one or more embodiments of the invention, client(s) (100) are implemented as computing devices. Each computing device may include one or more processors, memory (e.g., random access memory), and persistent storage (e.g., disk drives, solid state drives, etc.). The persistent storage may store computer instructions, (e.g., computer code), that when executed by the processor(s) of the computing device cause the computing device to issue one or more requests and to receive one or more responses. Examples of a computing device include a mobile phone, tablet computer, laptop computer, desktop computer, server, distributed computing system, or cloud resource.

In one or more embodiments of the invention, the client(s) (120) is implemented as a logical device. The logical device may utilize the computing resources of any number of computing devices and thereby provide the functionality of the client(s) (100) described throughout this application.

In one or more embodiments of the invention, client(s) (100) may request data and/or send data to the node(s) (104). Further, in one or more embodiments, client(s) (100) may initiate an application to execute on one or more node(s) (104) such the application may, itself, gather, transmit, and/or otherwise manipulate data on the node (e.g., node(s) (104)), remote to the client(s). In one or more embodiments, one or more client(s) (100) may share access to the same one or more node(s) (104) and may similarly share any data located on those node(s) (104).

In one or more embodiments of the invention, network (102) of the system is a collection of connected network devices that allow for the communication of data from one network device to other network devices, or the sharing of resources among network devices. Examples of a network (e.g., network (102)) include, but are not limited to, a local area network (LAN), a wide area network (WAN) (e.g., the Internet), a mobile network, or any other type of network that allows for the communication of data and sharing of resources among network devices and/or devices (e.g., clients (100), node(s) (104)) operatively connected to the network (102). In one embodiment of the invention, the client(s) (100) are operatively connected to the node(s) (104) via a network (e.g., network (102)).

Various embodiments of the node(s) (104) are provided in FIG. 2 and FIG. 3 below.

While FIG. 1 shows a specific configuration of a system, other configurations may be used without departing from the scope of the disclosure. For example, although the client(s) (100) and node(s) (104) are shown to be operatively connected through network (102), client(s) (100) and node(s) (104) may be directly connected, without an intervening network (e.g., network (102)). Further, the functioning of the client(s) (100) and the node(s) (104) is not dependent upon the functioning and/or existence of the other device(s) (e.g., node(s) (104) and client(s) (100), respectively). Rather, the client(s) (100) and the node(s) (104) may function independently and perform operations locally that do not require communication with other devices. Accordingly, embodiments disclosed herein should not be limited to the configuration of devices and/or components shown in FIG. 1.

Figure 2:
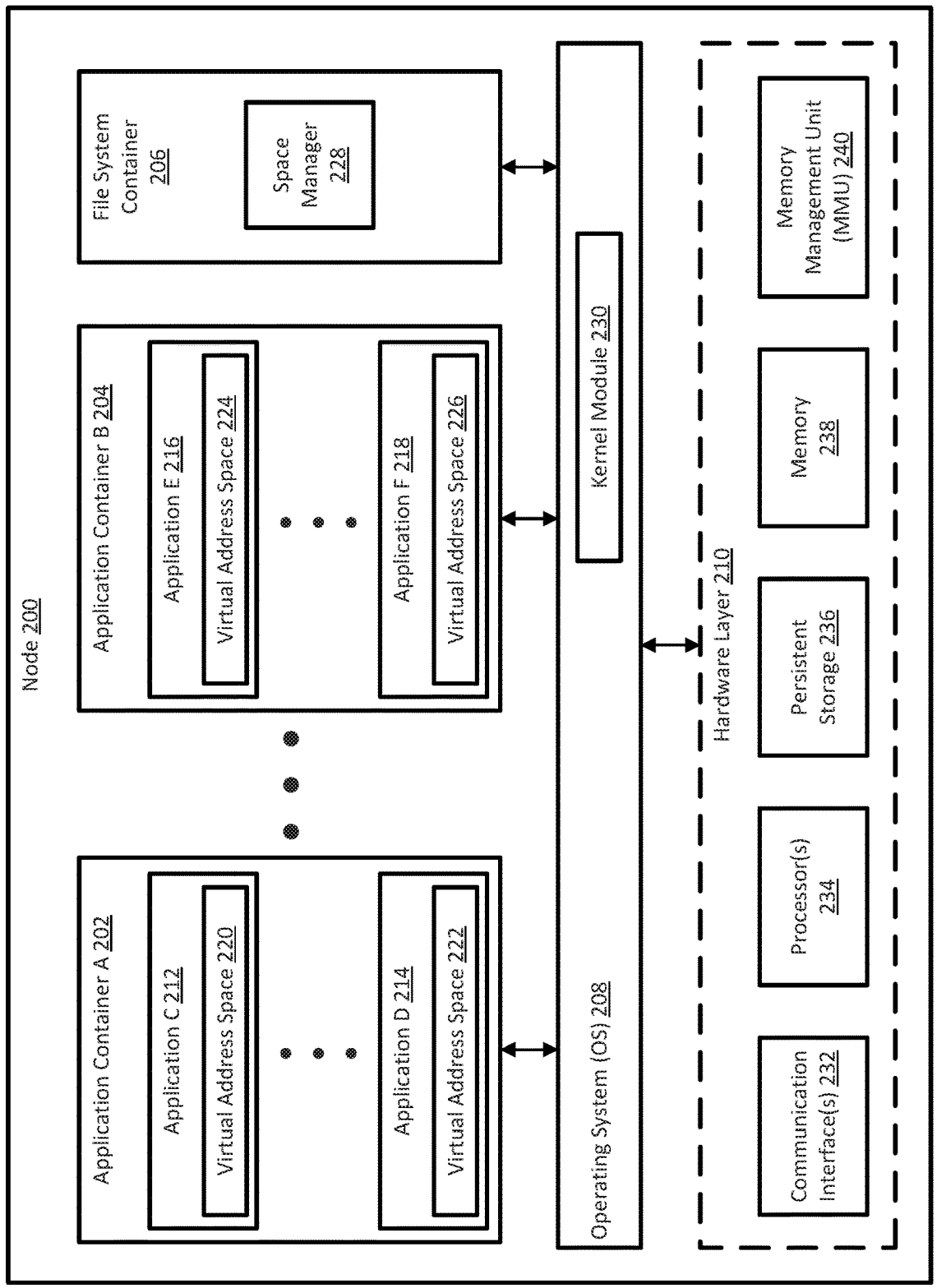
FIG. 2 shows a diagram of a node in accordance with one or more embodiments of the invention.

FIG. 2 shows a diagram of a node (200) in accordance with one or more embodiments of the invention. In one embodiment of the invention, node (200) includes one or more application container(s) (e.g., application container A (202), application container B (204)), a file system container (206), an operating system (OS) (208), and a hardware layer (210). Each of these components is described below. In one or more embodiments of the invention, the node (200) is configured to perform all, or a portion, of the functionality described in FIGS. 5-11.

In one or more embodiments of the invention, an application container (202, 204) is software executing on the node. In one embodiment of the invention, an application container (202, 204) may be an independent software instance that executes within a larger container management software instance (not shown) (e.g., Docker®, Kubernetes®). In one embodiment, where the application container (202, 204) is executing as an isolated software instance, the application container (202, 204) may establish a semi-isolated virtual environment, inside the container, in which to execute one or more applications (e.g., applications (212, 214, 216, 218), described below). In one embodiment of the invention, an application container (202, 204) may be executing in "user space" (e.g., a layer of the software that utilizes low-level system components for the execution of applications) of the operating system (OS) (208) of the node (200).

In one or more embodiments of the invention, an application container (202, 204) includes one or more applications (e.g., application C (212), application D (214), application E (216), application F (218)). In one embodiment of the invention, an application (212, 214, 216, 218) is software executing within the application container (e.g., 202, 204), that may include instructions which, when executed by a processor(s) (234), initiate the performance of one or more operations of components of the hardware layer (210). Although applications (212, 214, 216, 218) are shown executing within application containers (202, 204) of FIG. 2, one or more applications (e.g., 212, 214, 216, 218) may execute outside of an application container (e.g., 212, 214, 216, 218). That is, in one or more embodiments, one or more applications (e.g., 212, 214, 216, 218) may execute in a non-isolated instance, at the same level as the application container (202, 204) or file system container (206).

In one or more embodiments of the invention, each application (212, 214, 216, 218) includes a virtual address space (e.g., virtual address space (220), virtual address space (222), virtual address space (224), virtual address space (226)). In one embodiment of the invention, a virtual address space (220, 222, 224, 226) is a simulated range of addresses (e.g., identifiable locations) that mimics the physical locations of one or more components of the hardware layer (210). In one embodiment, an application (212, 214, 216, 218) is not configured to identify the physical addresses of one or more components of the hardware layer (210); rather, the application (212, 214, 216, 218) relies on other components of the node (200) to translate one or more virtual addresses of the virtual address space (e.g., 220, 222, 224, 226) to one or more physical addresses of one or more components of the hardware layer (210). Accordingly, in one or more embodiments of the invention, an application may utilize a virtual address space (220, 222, 224, 226) to read, write, and/or otherwise manipulate data, without being configured to directly identify the physical address of that data within the components of the hardware layer (210).

Additionally, in one or more embodiments of the invention, an application may coordinate with other components of the node (200) to establish a mapping between a virtual address space (e.g., 220, 222, 224, 226) and underlying physical components of the hardware layer (210). In one embodiment, if a mapping is established, an application's use of the virtual address space (e.g., 220, 222, 224, 226) enables the application to directly manipulate data of those physical components, without relying on other components of the node (200) to repeatedly update mappings between the virtual address space (e.g., 220, 222, 224, 226) and the physical addresses of one or more components of the hardware layer (210).

In one or more embodiments of the invention, a file system container (206) is software executing on the node (200). In one or more embodiments of the invention, a file system container (206) may be an independent software instance that executes within a larger container management software instance (not shown) (e.g., Docker®, Kubernetes®, etc.). In one embodiment, where the file system container (206) is executing as an isolated software instance, the file system container (206) may establish a semi-isolated virtual environment, inside the container, in which to execute an application (e.g., space manager (228), described below). In one embodiment of the invention, a file system container (206) may be executing in "user space" (e.g., a layer of the software that utilizes low-level system components for the execution of applications) of the OS (208).

In one embodiment of the invention, the file system container (206) includes a space manager (228). In one embodiment, a space manager (228) is software executing within the file system container (206), that may include instructions which, when executed, initiate operations of one or more components in the hardware layer (210).

In one or more embodiments of the invention, a space manager (228) may include functionality to generate one or more virtual-to-physical address mappings by translating a virtual address of a virtual address space (220, 222, 224, 226) to a physical address of a component in the hardware layer (210). Further, in one embodiment of the invention, the space manager may further be configured to communicate one or more virtual-to-physical address mappings to one or more components of the hardware layer (210) (e.g., memory management unit (240)). In one embodiments of the invention, the space manager (228) tracks and maintains virtual-to-physical address mappings through an abstraction layer (s) of virtual spaces that form a hierarchy of mappings to translate a virtual address to a physical address. In one or more embodiments of the invention, the space manager (228) is configured to maintain and utilize a hierarchy of addresses (via a sparse virtual space, one or more memory pool(s), and one or more persistent storage pool(s)) a described in FIG. 4. Additionally, in one or more embodiments of the invention, a space manager is configured to initiate the copying of data from one storage medium to another based on a determination that a storage device may be incapable of servicing an application request.

In one or more embodiments of the invention, an OS (208) is software executing on the node (200). In one embodiment of the invention, an OS (208) coordinates operations between software executing in "user space" (e.g., containers (202, 204, 206), applications (212, 214, 216, 218)) and one or more components of the hardware layer (210) to facilitate the proper use of those hardware layer (210) components. In one or more embodiments of the invention, the OS (208) includes a kernel module (230). In one embodiment of the invention, the kernel module (208) is software executing in the OS (208) that monitors data (which may include read and write requests) traversing the OS (208) and may intercept, modify, and/or otherwise alter that data based on one or more conditions. In one embodiment of the invention, the kernel module (230) is capable of redirecting data received by the OS (208) by intercepting and modifying that data to specify a recipient different than normally specified by the OS (208).

In one or more embodiments of the invention, the hardware layer (210) is a collection of physical components configured to perform the operations of the node (200) and/or otherwise execute the software of the node (200) (e.g., those of the containers (202, 204, 206), applications (212, 214, 216, 218).

In one embodiment of the invention, the hardware layer (210) includes one or more communication interface(s) (232). In one embodiment of the invention, a communication interface (232) is a hardware component that provides capabilities to interface the node (200) with one or more devices (e.g., a client, another node, a network of devices) and allow for the transmission and receipt of data with those device(s). A communication interface (232) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the hardware layer (210) includes one or more processor(s) (234). In one embodiment of the invention, a processor (234) may be an integrated circuit for processing instructions (e.g., those of the containers (202, 204, 206), applications (212, 214, 216, 218) and/or those received via a communication interface (232)). In one embodiment of the invention, processor(s) (234) may be one or more processor cores or processor micro-cores. Further, in one or more embodiments of the invention, one or more processor(s) (234) may include cache (as described in FIG. 3 below).

In one or more embodiments of the invention, the hardware layer (210) includes persistent storage (236). In one embodiment of the invention, persistent storage (236) may be one or more hardware devices capable of storing digital information (e.g., data) in a non-transitory medium. Further, in one embodiment of the invention, when accessing persistent storage (236), other components of node (200) are capable of only reading and writing data in fixed-length data segments (e.g., "blocks") that are larger than the smallest units of data normally accessible (e.g., "bytes").

Specifically, in one or more embodiments of the invention, when data is read from persistent storage (236), all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage (236).

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage (236).

Examples of "persistent storage" (236) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.).

In one or more embodiments of the invention, the hardware layer (210) includes memory (238). In one embodiment of the invention, memory (238), similar to persistent storage (236), may be one or more hardware devices capable of storing digital information (e.g., data) in a non-transitory medium. However, unlike persistent storage (236), in one or more embodiments of the invention, when accessing memory (238), other components of node (200) are capable of reading and writing data at the smallest units of data normally accessible (e.g., "bytes").

Specifically, in one or more embodiments of the invention, memory (238) may include a unique physical address for each byte stored thereon, thereby enabling software (e.g., applications (212, 214, 216, 218), containers (202, 204, 206)) to access and manipulate data stored in memory (238) by directing commands to a physical address of memory (238) that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage, "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory devices (238).

Examples of memory (238) devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

In one embodiment of the invention, the hardware layer (210) includes a memory management unit (MMU) (240). In one or more embodiments of the invention, an MMU (240) is hardware configured to translate virtual addresses (e.g., those of a virtual address space (220, 222, 224, 226)) to physical addresses (e.g., those of memory (238)). In one embodiment of the invention, an MMU (240) is operatively connected to memory (238) and is the sole path to access any memory device (e.g., memory (238)) as all commands and data destined for memory (238) must first traverse the MMU (240) prior to accessing memory (238). In one or more embodiments of the invention, an MMU (240) may be configured to handle memory protection (allowing only certain applications to access memory) and provide cache control and bus arbitration. Further, in one or more embodiments of the invention, an MMU (240) may include a translation lookaside buffer (as described in FIG. 3 below).

While FIG. 2 shows a specific configuration of a node, other configurations may be used without departing from the scope of the disclosure. Accordingly, embodiments disclosed herein should not be limited to the configuration of devices and/or components shown in FIG. 2.

Figure 3:
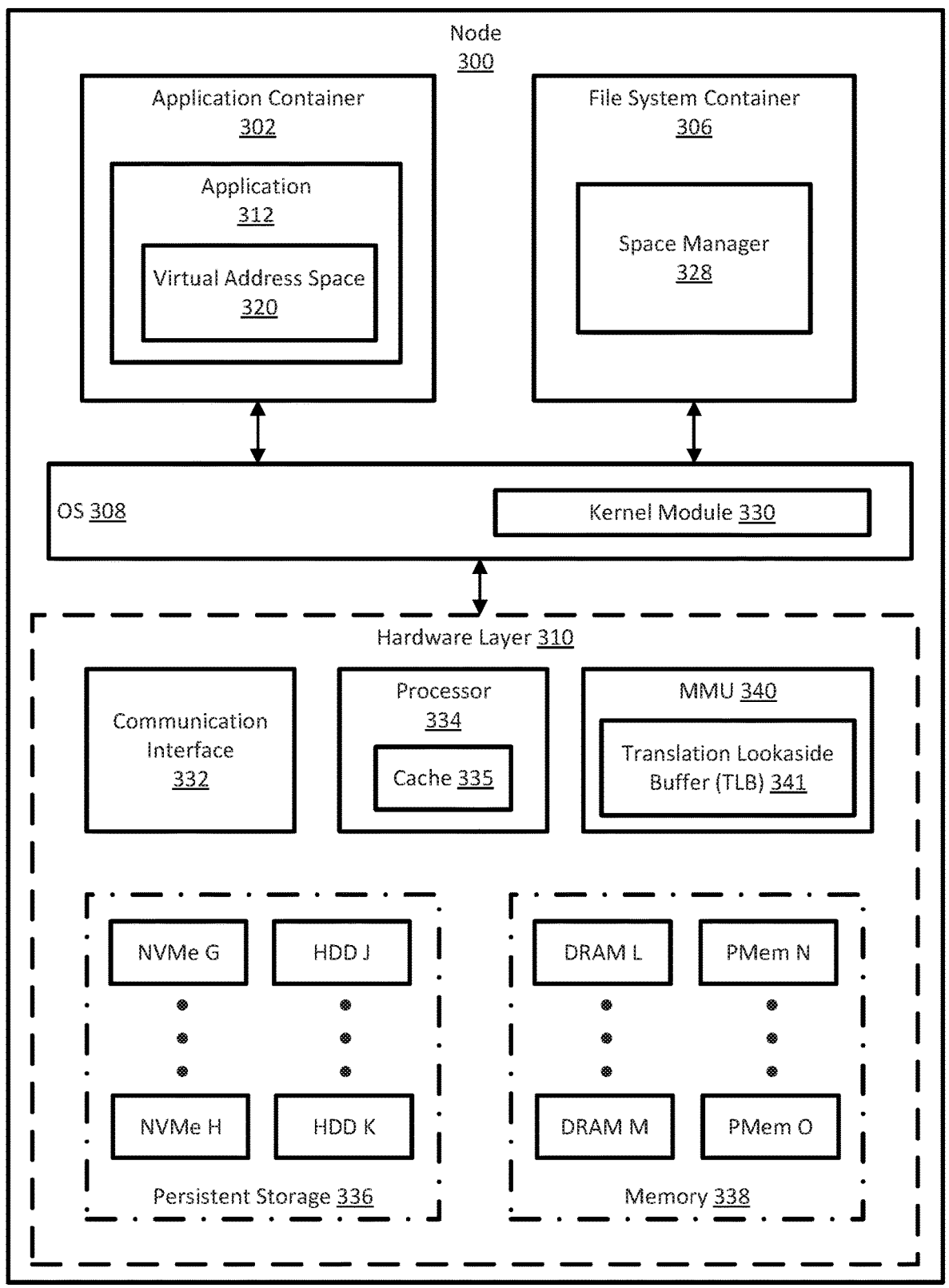
FIG. 3 shows an example of a node in accordance with one or more embodiments of the invention.

FIG. 3 shows an example of one embodiment of a node (300). In one embodiment of the invention, node (300) includes an application container (302) with application (312) and virtual address space (320), a file system container (306) with space manager (328), an OS (308) with kernel module (330), and a hardware layer (310) with communication interface (332), processor (334) with cache (335), MMU (340) with a translation lookaside buffer (TLB) (341), persistent storage (336), and memory (338). Similarly named parts shown in FIG. 3 have all of the same properties and functionalities as described above in FIG. 2. Accordingly, only additional properties and functionalities will be described below.

In one or more embodiments of the invention, processor (334) includes cache (335). In one embodiment of the invention, cache (335) may be one or more hardware devices capable of storing digital information (e.g., data) in a non-transitory medium. Cache (335) may be used internally by the processor (334) to perform operations on data, as requested by one or more software instances (e.g., application container (302), application (312), file system container (306), space manager (328), OS (308), etc.) or hardware layer components (e.g., communication interface (332), MMU (340), TLB (341), etc.).

In one or more embodiments of the invention, cache (335) is a limited resource (e.g., little total space) and may therefore reach a maximum capacity more quickly than other devices of the hardware layer (e.g., persistent storage (336) and memory (338)). However, although limited in total capacity, cache may be significantly faster at performing operations (e.g., reading, writing) than other devices of the hardware layer (e.g., persistent storage (336) and memory (338)). In one embodiment of the invention, data may only be located in cache temporarily, prior to being copied to memory (338) and/or persistent storage (336). Further data, located in cache, may be considered "uncommitted" or "dirty" until copied to memory (338) and/or persistent storage (336).

In one or more embodiments of the invention, MMU (340) includes TLB (341). In one embodiment of the invention, TLB (341) may be one or more hardware devices capable of storing digital information (e.g., data) in a non-transitory medium. Specifically, in one embodiment of the invention, the TLB (341) stores one or more virtual-to-physical address mappings which the MMU may access.

In one or more embodiments of the invention, although memory (338) may use a series of physical addresses to locate data, application (312) uses a series of virtual addresses (e.g., those of virtual address space (320)) to reference data. Accordingly, the TLB (341) provides the MMU (340) a translation table that includes one or more virtual-to-physical address mappings to identify the physical address of memory (338) associated with a virtual address (as specified by an application request). Although shown as a component of MMU (340), the TLB (341) may be located outside of the MMU (340) and inside the hardware layer (310) generally, or as part of processor (334).

In the example shown here, persistent storage (336) is shown to include one or more NVMe devices and one or more HDD devices. Similarly, in the example shown here, memory (338) is shown to include a one or more DRAM devices and one or more PMem devices. These specific instances of persistent storage devices and memory devices in FIG. 3 are shown for illustrative purposes only. One of ordinary skill in the art, having the benefit of this detailed description, would appreciate that persistent storage (336) and memory (338) may be comprised of any number of appropriate devices.

While FIG. 3 shows a specific example of a node, other configurations may be used without departing from the scope of the disclosure. Accordingly, embodiments disclosed herein should not be limited to the configuration of devices and/or components shown in FIG. 3.

Figure 4:
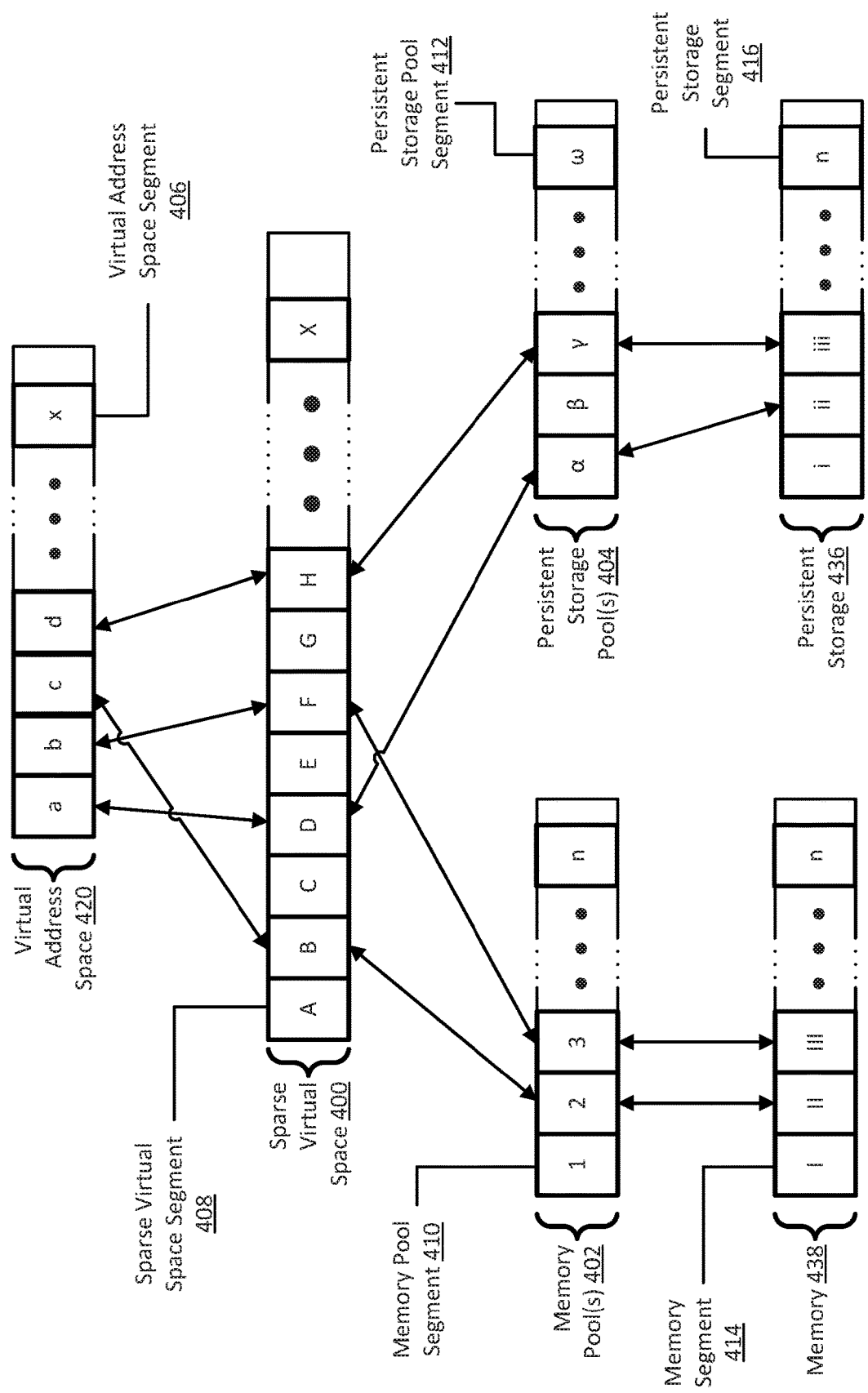
FIG. 4 shows relationships between various virtual and physical elements in the system in accordance with one or more embodiments of the invention.

FIG. 4 shows a diagram of a virtual-to-physical segment hierarchy in accordance with one or more embodiments of the invention. In one embodiment of the invention, the virtual-to-physical segment hierarchy includes a virtual address space (420), a sparse virtual space (400), one or more memory pool(s) (402), one or more persistent storage pool(s) (404), memory (438), and persistent storage (436). Each of these components is described below.

In one or more embodiments of the invention, virtual address space (420) has all of the same properties and functionalities as the virtual address space(s) described above in FIG. 1. Additionally, in one embodiment of the invention, a virtual address space (e.g., virtual address space (420)) may include one or more virtual address space segment(s) (e.g., virtual address space segment (406)). In one or more embodiments of the invention, a virtual address space segment (406) may correspond to some other smaller portion of the virtual address space (420) (e.g., a subset of virtual addresses). In one embodiment of the invention, virtual address space segment (406) may be associated with a single virtual address (as described in FIG. 1). In one or more embodiments of the invention, a virtual address space address segment (406) is mapped to a sparse virtual space segment (408) (described below). In one embodiment of the invention, every virtual address space segment (e.g., virtual address space segment (404)) is individually and uniquely mapped to a unique sparse virtual space segment (e.g., sparse virtual space segment (408)).

In one or more embodiments of the invention, sparse virtual space (400) is a sparse, virtual data structure that provides a comprehensive layout and mapping of data managed by the file system container of the node. In one embodiment of the invention, the sparse virtual space (400) spans the entire virtual-to-physical segment hierarchy, such that every adjacent layer in in the virtual-to-physical segment hierarchy maps to the sparse virtual space (400). That is, while there may be multiple virtual address space(s) (e.g., virtual address space (420), others not shown) and there may be multiple pool(s) for storage (e.g., memory pool(s) (402), persistent storage pool(s) (404)), there is only one sparse virtual space (400).

Further, as the sparse virtual space (400) may need to be continually updated to allow for new internal associations with adjacent layers, the sparse virtual space (400) may be initially allocated substantially sparse enough to be able to handle new associations without having to allocate additional space outside of that initially reserved. Accordingly, for example, the sparse virtual space may be allocated with several petabytes of sparse space, with the intention being that the physical memory and persistent storage (associated with the sparse virtual space) will not exceed several petabytes of physical storage space.

In one or more embodiments of the invention, the sparse virtual space (400) may include one or more sparse virtual space segment(s) (e.g., sparse virtual space segment (408)). In one embodiment of the invention, a sparse virtual space segment (408) is a smaller virtual sub-region of the sparse virtual space (400) that is uniquely associated with some data. In one or more embodiments of the invention, a sparse virtual space segment (408) may provide the logical volume and logical volume offset for data (physically located in the persistent storage and/or memory of the node).

In one or more embodiments of the invention, each sparse virtual space segment (e.g., sparse virtual space segment (408)) is uniquely associated with a unique memory pool segment (410) or a unique persistent storage pool segment (412), as explained below.

In one or more embodiments of the invention, each sparse virtual space segment (408) may be uniformly sized throughout the sparse virtual space (400). In one or more embodiments of the invention, each sparse virtual space segment (408) may be equal to the largest memory pool segment (410) or persistent storage pool segment (412) associated with the sparse virtual space (e.g., the largest block of a persistent storage device). Alternatively, in one or more embodiments of the invention, each sparse virtual space segment (408) may be allocated to be sufficiently larger than any current and future individual memory pool segment (410) and/or persistent storage pool segment (412) (e.g., larger than a persistent storage block).

In one or more embodiments of the invention, memory pool(s) (402) are virtual data spaces that identify physical regions of a portion of, one, or several memory devices (e.g., memory (438)) of the hardware layer. Memory pool(s) (402) may identify physical regions of memory by maintaining a virtual mapping to the physical addresses of data that comprise those memory devices (e.g., memory (438)).

In one or more embodiments of the invention, several memory pools (402) may concurrently exist, each of which is independently mapped to part of, one, or several memory devices (e.g., memory (438)). Alternatively, in one embodiment of the invention, there may only be a single memory pool (402) associated with the physical regions of data of all memory devices (e.g., memory (438)) in a node.

In one embodiment of the invention, a single memory pool (of memory pool(s) (402)) may be uniquely associated with a single memory device. Accordingly, a single memory pool may provide a one-to-one virtual emulation of a single memory device of the hardware layer. Alternatively, in one or more embodiments of the invention, a single memory pool may be associated with multiple memory devices, each sharing some characteristic. For example, there may be a single memory pool for two or more DRAM devices and a second memory pool for two or more PMem devices. One of ordinary skill in the art, having the benefit of this detailed description, would appreciate that memory pool(s) (402) may be organized by any suitable characteristic of the underlying memory (e.g., based on individual size, collective size, type, speed, etc.).

In one or more embodiments of the invention, memory pool(s) (402) include one or more memory pool segment(s) (e.g., memory pool segment (410)). In one embodiment of the invention, a memory pool segment (410) is a smaller sub-region of a memory pool (402) that is uniquely associated with some data located in memory (438). Further, one or more memory pool segment(s) (410) may be uniquely associated with one or more unique regions of a memory device (e.g., memory segment (414)). For example, memory pool segment (410) may be associated with a physical address range on a memory device (e.g., memory (438)) that corresponds to the physical location of a single byte of data (as explained below).

In one or more embodiments of the invention, memory (438) has all of the same properties and functionalities as the memory described in FIG. 1 above. Additionally, as disclosed in FIG. 4, memory (438) may include one or more memory segment(s) (e.g., memory segment (414)) that divide memory (438) in smaller sub-regions. In one or more embodiments of the invention, a memory segment (414) is a unique physical region of the memory (438) that stores data and is accessible using a physical address.

In one or more embodiments of the invention, as shown in FIG. 4, two or more contiguous memory pool segments (410) are associated with two or more contiguous memory segments (414), respectively. Accordingly, there may be a sequential mapping between memory (438) and a memory pool (402) such that by referencing a sequence of memory pool segments (e.g., "1", "2", "3" of memory pool(s) (402)), a corresponding sequence of memory segments (e.g., "I", "II", "III" of memory (438)) will be accessed. Further, when a direct mapping between a memory pool (402) and memory (438) is maintained, the memory pool, alone, provides an accurate, direct, and sequential representation of the underlying memory (e.g., total space, data location, available space, etc.). Alternatively, in one embodiment of the invention, a series of memory pool segment(s) (410) are not consecutively associated with a series of memory segment(s) (414) (not shown).

In one or more embodiments of the invention, persistent storage pool(s) (404) are virtual data spaces that identify regions of a portion of, one, or several persistent storage devices (e.g., persistent storage (436)) of the hardware layer. Persistent storage pool(s) (404) may identify physical regions of persistent storage by maintaining a virtual mapping to the physical location of data that comprise those persistent storage devices (e.g., persistent storage (436)).

In one or more embodiments of the invention, several persistent storage pools (404) may concurrently exist, each of which is independently mapped to part of, one, or several persistent storage devices (e.g., persistent storage (436)). Alternatively, in one embodiment of the invention, there may only be a single persistent storage pool (404) associated with the physical locations of data on all persistent storage devices (e.g., persistent storage (438)) in a node.

In one embodiment of the invention, a single persistent storage pool (of persistent storage pool(s) (404)) may be uniquely associated with a single persistent storage device. Accordingly, a single persistent storage pool may provide a one-to-one virtual emulation of a single persistent storage device of the hardware layer. Alternatively, in one or more embodiments of the invention, a single persistent storage pool may be associated with multiple persistent storage devices, each sharing some characteristic. For example, there may be a first persistent storage pool for two or more NVMe devices and a second persistent storage pool for two or more SSD devices. One of ordinary skill in the art, having the benefit of this detailed description, would appreciate that persistent storage pool(s) (404) may be organized by any suitable characteristic of the underlying persistent storage (e.g., based on individual size, collective size, type, speed, etc.).

In one or more embodiments of the invention, persistent storage pool(s) (404) include one or more persistent storage pool segment(s) (e.g., persistent storage pool segment (412)). In one embodiment of the invention, a persistent storage pool segment (412) is a smaller sub-region of a persistent storage pool (404) that is uniquely associated with some data located in persistent storage (436). Further, one or more persistent storage pool segment(s) (412) may be uniquely associated with one or more unique regions of a persistent storage device (e.g., persistent storage segment (416)).

In one or more embodiments of the invention, persistent storage (436) has all of the same properties and functionalities as the persistent storage described in FIG. 1 above. Additionally, as disclosed in FIG. 4, persistent storage (436) may include one or more persistent storage segment(s) (e.g., persistent storage segment (416)) that divide persistent storage (436) in smaller sub-regions. In one or more embodiments of the invention, a persistent storage segment (416) is a unique physical region of persistent storage (436) that stores data and is accessible using a physical address.

In one or more embodiments of the invention, as shown in FIG. 4, two or more contiguous persistent storage pool segments (412) are not associated with two or more contiguous persistent storage segments (416). Accordingly, there may be a non-sequential mapping between persistent storage (436) and a persistent storage pool (404) such that by referencing a non-sequential series of persistent storage pool segments (e.g., "α", "γ", of persistent storage pool(s) (404)), a corresponding sequential or non-sequential series of persistent storage segments (e.g., "ii", "iii" of persistent storage (436)) will be accessed. Alternatively, in one embodiment of the invention, like memory pool(s) (402) and memory (438), there may be a corresponding sequential association of segments between the persistent storage pool segments (412) and persistent storage segments (416) (not shown).

Accordingly, in one embodiment of the invention, the virtual-to-physical segment hierarchy of FIG. 4 provides a mapping from a virtual address space segment (406) of an application to a physical location of the hardware (memory segment (414) or persistent storage segment (416)).

As an example, virtual address space (420) may correspond to a single file being accessed by the application where each virtual address space segment ("a", "b", "c", and "d") represent four bytes of that file. In order for the application to access those four bytes, the space manager locates, in the sparse virtual space, the unique sparse virtual space segments that are associated with those four bytes ("D", "F", "B", and "H", respectively). In turn, two of those sparse virtual space segments ("B" and "F") are mapped to two memory pool segments ("2" and "3", respectively); while the other two sparse virtual space segments ("D" and "H") are mapped to two persistent pool segments ("α" and "γ", respectively). As the memory pool (402) maintains a one-to-one sequential mapping to memory (438), the two memory pool segments, "2" and "3", directly correspond to memory segments "II" and "III". For persistent storage pool (404), however, a sequential mapping to persistent storage (436) is not maintained, and the two persistent pool segments, "α" and "γ", are associated with persistent storage segments "ii" and "iii", respectively. Accordingly, the original segments of data ("a", "b", "c", and "d") may be translated to the physical locations of each segment ("ii", "III", "II", and "ii", respectively) using the virtual-to-physical segment hierarchy.

While FIG. 4 shows a specific configuration of a virtual-to-physical segment hierarchy, other configurations may be used without departing from the scope of the disclosure. For instance, as discussed above, there may be many virtual address spaces of several applications that may access the sparse virtual space to identify the physical location of data. Further, there can be any number of memory pools and/or persistent storage pools mapping into the sparse virtual space. Similarly, the memory pools and persistent storage pools may be mapped into any number of memory and persistent storage devices, respectively. Accordingly, embodiments disclosed herein should not be limited to the configuration of devices and/or components shown in FIG. 4.

Figure 5:
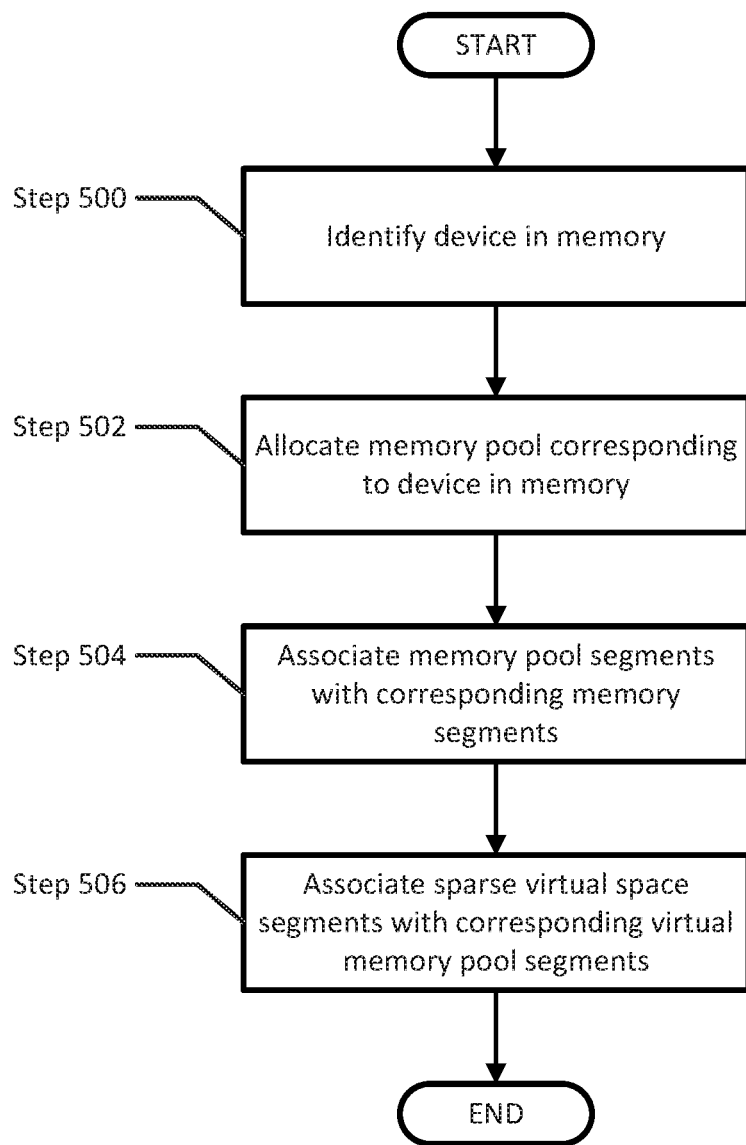
FIG. 5 shows a flowchart of a method of configuring the system in accordance with one or more embodiments of the invention.

FIG. 5 shows a flowchart of a method of creating a memory pool and a sparse virtual space, in accordance with one or more embodiments of the invention. All or a portion of the method shown in FIG. 5 may be performed by the space manager. Another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, a space manager identifies one or more memory devices to which the node has access. In one or more embodiments of the invention, the selection of memory devices may be based on connectivity (i.e., if an operative connection to the memory devices exists), permissions to access the memory device, physical location (e.g., located within the node, or accessible through a communication interface), and/or other management roles (e.g., file system ownership). Further, some portion of a single memory device may be available to a space manager, while another portion of that same memory device will be inaccessible based on one or more of the aforementioned characteristics.

In one or more embodiments of the invention, a space manager will be caused to identify all memory devices to which the node has access (Step 500) based on one or more conditions including, for example, the node being initially configured, a change in the hardware being detected, user instruction, and/or other any other event that would cause the space manager to need to establish (or otherwise update) a sparse virtual space and memory pools.

In Step 502, the space manager allocates one or more memory pools corresponding to the one or more memory devices identified in Step 500. Specifically, as discussed above with respect to FIG. 4, memory pools may be created and/or organized based on any suitable characteristic of the underlying memory (e.g., individual size, collective size, type, speed, etc.). For example, if two DRAM devices and one PMem are identified in Step 500, the space manager may create two memory pools, one memory pool for both DRAM devices, and one memory pool for the PMem device.

Further, in one embodiment of the invention, the memory pool(s) created by the space manager are created to correspond to the size of the underlying memory. For example, if the first DRAM device is 1,000 Mb, the second DRAM device is 1,500 Mb, and the PMem device is 2,000 Mb, the first memory pool (associated with the DRAM) will need to be at least 2,500 Mb of virtual space whereas the second memory pool will need to be at least 2,000 Mb of virtual space.

Continuing with the example, if a first memory pool corresponds to two DRAM devices, the space manager may associate a first portion of the memory pool to the first DRAM device and a second portion of the memory pool to the second DRAM device. Then, assuming the same sizes described above, the first memory pool (associated with the DRAM devices) is divided into two portions, 1,000 Mb for the first portion, 1,500 Mb for the second portion. Further, as the second memory pool is only associated with a single PMem device, there is no need to allocate a device-level portion in the second memory pool.

In Step 504, the space manager partitions the memory pool(s) into an appropriate number of memory pool segments corresponding to the memory devices identified in Step 500. The size of each of the memory pool segments may be determined by the space manager and/or based on the underlying characteristics of the memory devices.

In one or more embodiments of the invention, each memory pool is divided into the number of segments equal to the number of bytes accessible on that memory device (e.g., memory segments). Continuing with the example above, the first region of the first memory pool (associated with the 1,000 Mb DRAM device) is partitioned into 1,000 segments. The second region of the first memory pool (associated with the 1,500 Mb DRAM device) is partitioned into 1,500 segments. And, finally, the second memory pool (associated with the 2,000 Mb PMem device) is partitioned into 2,000 segments, corresponding to the 2,000 Mb of that PMem device.

In one or more embodiments of the invention, once each memory pool is partitioned into memory pool segments, each memory pool segment is associated with a corresponding memory segment. Thus, for example, the first memory segment of the first DRAM device is associated with the first memory pool segment of the first memory pool associated with DRAM device. Then, for each sequential addressable region of the memory device, the same association may be established with corresponding memory pool segment.

In Step 506, each memory pool segment is associated with a unique sparse virtual space segment. In one or more embodiments of the invention, in the event that the sparse virtual space does not yet exist, the space manager allocates a sufficiently large region of virtual space to allow for associations to all existing and future memory devices. As described above for FIG. 4, the sparse virtual space may be allocated with several petabytes of sparse space, with the intention being that the physical memory and persistent storage (associated with the sparse virtual space) will not exceed several petabytes of physical storage space.

In one or more embodiments of the invention, after the creation of the sparse virtual space, the space manager divides the entire sparse virtual space into uniformly sized segments. As described above for FIG. 4, in one or more embodiments of the invention, each sparse virtual space segment may be allocated to be sufficiently larger than any current and future individual memory pool segment and/or persistent storage pool segment (e.g., larger than a persistent storage block).

In one or more embodiments of the invention, once the sparse virtual space is partitioned into a very large number of sparse virtual space segments, each memory pool segment (created in Step 504) is associated with one of the sparse virtual space segments. In one embodiment of the invention, the sparse virtual space segments, associated with the memory pool segments, are scattered throughout the sparse virtual space with no particular ordering. Alternatively, in one embodiment of the invention, the sparse virtual space segments associated with memory segments are grouped consecutively, or in multiple consecutive sequences throughout the sparse virtual space.

Continuing with the example above, the 3,500 memory pool segments created across the two memory pools would then be associated with 3,500 sparse virtual space segments. In one embodiment of the invention, the sparse virtual space segments associated with the memory pool segments may be spread throughout the sparse virtual space, without any forced order or general organization.

Alternatively, in one or more embodiments of the invention, the space manager will not, initially, associate any sparse virtual space segments with the memory pool segments. Instead, for example, if the memory devices contain no data, the space manager may wait until a write request is received before associating one or more sparse virtual space segments with one or more memory pool segments.

Further, while Steps 500-506 only explain the process in relation to memory and memory devices, this same process may also apply to persistent storage, albeit modified, where necessary, to conform with the differences between memory and persistent storage, as discussed in FIGS. 2 and 4.

Figure 6A:
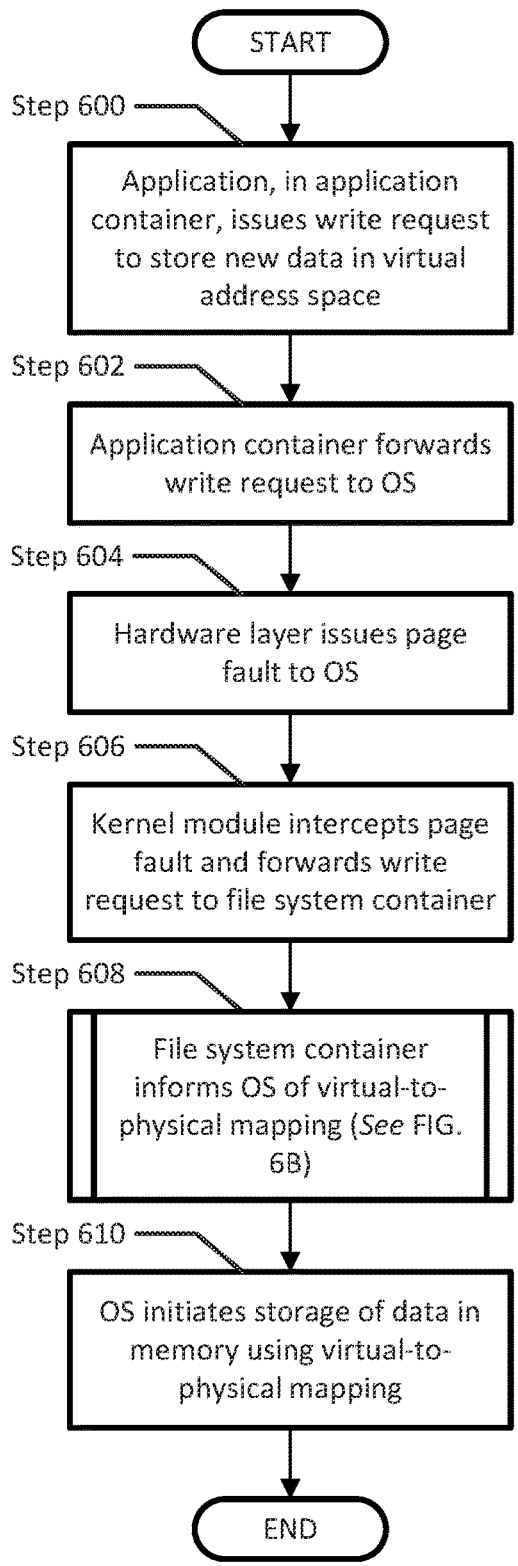
FIG. 6A shows a flowchart of a method of generating and servicing a write request in accordance with one or more embodiments of the invention.

FIG. 6A shows a flowchart of a method for writing new data to memory of the node, in accordance with one or more embodiments of the invention. All or a portion of the method shown in FIG. 6A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 600, an application issues a write request to store new data in the virtual address space of that application. In one or more embodiments of the invention, the write request specifies the virtual address space segment (e.g., virtual address) and the data to be written. Further, in one embodiment of the invention, as the data is new, there is no known physical location to store the data when initially generated, and therefore a location must be newly identified.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 602, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operation of the node.

In Step 604, the hardware layer of the node issues of page fault to the OS. In one or more embodiments of the invention, a page fault is an exception handling process of the OS caused by one or more components of the hardware layer receiving an invalid request.

In one embodiment of the invention, a page fault is issued by a processor when an invalid reference is provided to an MMU. Specifically, when a request to access or modify memory is sent to the MMU, using a virtual address, the MMU may perform a lookup in the TLB to find a physical address associated with the provided virtual address (e.g., a virtual-to-physical address mapping). However, if the TLB does not provide a physical address associated with the virtual address (e.g., due to the TLB lacking the appropriate virtual-to-physical address mapping), the MMU will be unable to perform the requested operation. Accordingly, the MMU informs the processor that the request cannot be serviced, and in turn, the processor issues a page fault back to the OS informing that the request could not be serviced.

In one or more embodiments of the invention, the page fault specifies the original write request (i.e., the data to be written and the virtual address) and the reason for the page fault (that the MMU could not locate the virtual-to-physical address mapping).

In Step 606, the kernel module of the OS intercepts the page fault and forwards the page fault (and the associated write request) to the file system container of the node. In one embodiment of the invention, the kernel module may forward only the write request, as initially generated by the application, to the file system container.

In one or more embodiments of the invention, as described in FIG. 1 above, the kernel module is software executing in the OS that monitors data traversing the OS and may intercept, modify, and/or otherwise alter that data based on one or more conditions. In one embodiment of the invention, the kernel module is capable of redirecting data received by the OS by intercepting and modifying that data to specify a recipient different than normally specified by the OS.

In one or more embodiments of the invention, the OS will, initially, be configured to forward the page fault to the application from which the request originated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 608, the file system container, having received and processed the page fault forwarded by the kernel module, informs the OS of the proper virtual-to-physical address mapping for the write request. More details of the process of Step 608 are discussed in relation to FIG. 6B below.

In Step 610, the OS initiates writing of the requested data to the hardware layer of the node. In one or more embodiments of the invention, the write request, initially generated by the application, is serviced by storing, in memory, the requested data.

Specifically, in one or more embodiments of the invention, after receiving the virtual-to-physical address mapping from the file system container in Step 608, the OS informs the hardware layer (the MMU, specifically) of the virtual-to-physical address mapping. In turn, the MMU creates an entry in the TLB that associates the virtual address (of the application's virtual address space) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS reissues and/or forwards the initial write request back to hardware layer of the node. Then, as the hardware layer is now configured to service the request, the data is written to the physical address specified in the TLB (as identified by the file system container).

Figure 6B:
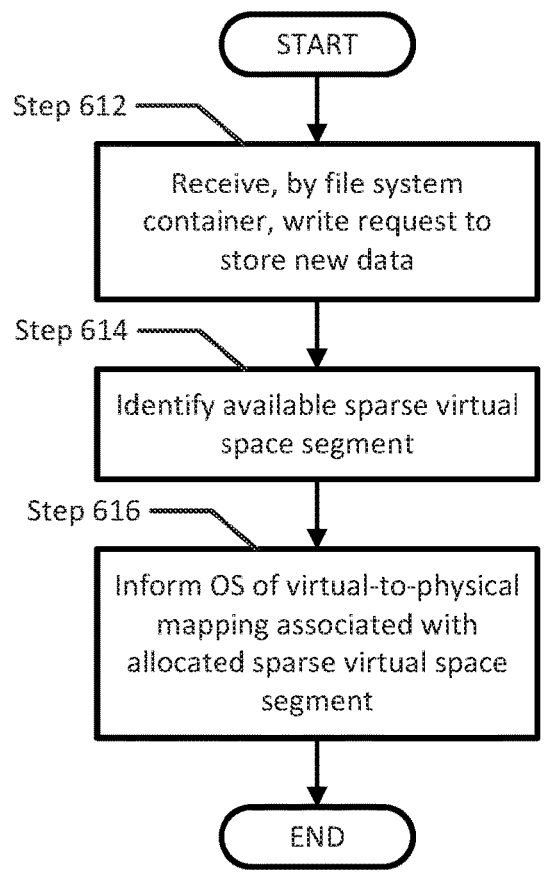
FIG. 6B shows a flowchart of a method of servicing a write request in accordance with one or more embodiments of the invention.

FIG. 6B shows a flowchart of a method for identifying a physical location to store new data, in accordance with one or more embodiments of the invention. All or a portion of the method shown in FIG. 6B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 612, the file system container receives a write request to store new data. As discussed above in Step 606, the file system container may receive a page fault (containing the write request) or the write request, alone, from a kernel module of the node. In one or more embodiments of the invention, the space manager of the file system container, performs the processing of the write request.

In Step 614, the space manager identifies one or more available sparse virtual space segments for the new data. In one or more embodiments of the invention, as described in Step 506 above, the space manager may have already allocated and associated every sparse virtual space segment with every available memory pool segment. However, in one or more embodiments of the invention, the space manager may not associate sparse virtual space segments with memory pool segments until receiving a write request.

In turn, in one or more embodiments of the invention, the space manager identifies one or more sparse virtual space segments sufficiently large enough (e.g., containing sufficient free space) to service the write request. If not already associated with memory pool segments, the space manager identifies one or more memory pool segments sufficiently large enough (e.g., containing sufficient free space) to service the write request and associate those memory pool segments with available sparse virtual space segments.

In one or more embodiments of the invention, once the one or more memory pool segments are identified, the associated one or more memory segments are identified based on a prior established mapping (see e.g., FIGS. 4-5).

In Step 616, the file system container informs the OS of the virtual-to-physical address mapping. In one or more embodiments of the invention, once a physical address of the memory is known, the space manager generates a virtual-to-physical address mapping using the virtual address received with the write request and the physical address identified in the memory pool.

In one or more embodiments of the invention, once the virtual-to-physical address mapping is generated, the space manager initiates the transmission of the virtual-to-physical address mapping to the OS (to ultimately inform the MMU). As the space manager may be an isolated software instance executing within the file system container, the file system container may be the software instance that directly forwards the mapping to the OS.

In one or more embodiments of the invention, the file system container may also re-forward the write request back to the OS for servicing. Alternatively, in one embodiment of the invention, the OS may have temporarily stored the write request, while the file system container generated and provided the virtual-to-physical address mapping, so that the write request could be resent upon the receipt of the corresponding virtual-to-physical address mapping.

FIG. 7A shows a flowchart of a method for establishing direct access to memory of the hardware layer of the node via a virtual-to-physical address mapping, in accordance with one or more embodiments of the invention. All or a portion of the method shown in FIG. 7A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 700, an application issues a mapping request for data in the virtual address space of that application. In one or more embodiments of the invention, the mapping request specifies the virtual address space segment (e.g., virtual address) of the virtual address space. In one or more embodiments of the invention, the mapping request specifies the data using a file identifier and a file offset. Further, in one embodiment of the invention, as the data being directly accessed already exists, it is assumed the physical location of the data is identifiable.

In one or more embodiments of the invention, a mapping request is a request to establish a one-to-one mapping between one or more virtual address space segments and one or more memory segments (e.g., one or more virtual-to-physical address mappings that directly correlate application virtual memory address(es) to physical memory address (es)). Further, in one embodiment of the invention, as mapping to a region of memory requires that data to be located on a byte-addressable device (i.e., memory), it is therefore not possible to establish a direct mapping to data physically stored in persistent storage. That is, persistent storage is not configured to support, and is therefore not suitable for, servicing mapping requests, and the requested data will therefore need to be relocated to a suitable device in order to establish the requested direct access mapping (as discussed in relation to FIG. 7B below)

In one or more embodiments of the invention, as described in FIG. 1 above, the application may be executing within an application container that has the ability to access the OS of the node. Thus, when an application, isolated in an application container, issues a mapping request to an internal virtual address space, the application container handles that command before interacting with the OS.

In Step 702, the application container, to which the application belongs, forwards the mapping request to the OS. In one or more embodiments of the invention, although the application issued the mapping request to the virtual address space of the application, such internal requests ultimately trigger external commands to the underlying OS so that the request to the virtual address space may be serviced by the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 704, a determination is made as to whether a page fault is issued by the hardware layer of the node. In one or more embodiments of the invention, the virtual address specified by the mapping request will already be mapped to a physical address in the TLB with a virtual-to-physical address mapping. However, if the TLB lacks an entry associating the virtual address to any physical address, the hardware layer issues a page fault as described in Step 604 above. If a page fault is not issued (704—NO), the process proceeds to Step 710. Alternatively, if a page fault is issued (704—YES), the process proceeds to Step 706. In one or more embodiments of the invention, the page fault may include the initial mapping request and an indication that the virtual-to-physical address mapping does not exist in the TLB.

In Step 706, the kernel module intercepts and forwards the page fault to the file system container. In one or more embodiments of the invention, as described in Step 606 above, the OS is initially configured to forward the page fault to the application from which the request originally initiated. However, in one embodiment of the invention, the kernel module detects the OS received a page fault, and instead forwards the page fault to a different location (i.e., the file system container) instead of the default recipient (i.e., the application container and/or application). In one embodiment of the invention, the kernel module specifically monitors for and detects exception handling processes that specify an application's inability to access the physical location of data.

In Step 708, the file system container, having received and processed the page fault forwarded by the kernel module, informs the OS of the proper virtual-to-physical address mapping for the write request. More details of the process of Step 708 are discussed in relation to FIG. 7B below.

In Step 710, the OS informs the application that a memory mapping has been established. In one or more embodiments of the invention, the mapping request, initially generated by the application, is serviced by informing the MMU (and TLB) of the virtual-to-physical address mapping associated with the virtual address specified by the application.

Specifically, in one or more embodiments of the invention, after receiving the virtual-to-physical address mapping from the file system container in Step 708, the OS informs the hardware layer (the MMU, specifically) of the virtual-to-physical address mapping. In turn, the MMU creates an entry in the TLB that associates the virtual address (initially specified by the application) to the physical address specified by the file system container. Accordingly, when the MMU receives any additional requests specifying that same virtual address, the MMU will then be able to locate the associated physical address in the TLB (and therefore avoid issuing a page fault).

Thus, in one or more embodiments of the invention, after the TLB includes the appropriate virtual-to-physical address mapping, the OS informs the application of the successful memory mapping. Accordingly, the hardware layer of the node is then configured to directly service any request referencing that virtual address. More detail on the direct access to hardware layer components is discussed in FIGS. 8A and 8B below.

FIG. 7B shows a flowchart of a method for identifying a physical location that satisfies the mapping request, in accordance with one or more embodiments of the invention. All or a portion of the method shown in FIG. 7B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 712, the file system container receives a mapping request to data located in memory. As discussed above in Step 706, the file system container may receive a page fault (including the mapping request) or the mapping request, alone, from a kernel module of the node. In one or more embodiments of the invention, the space manager of the file system container processes the mapping request.

In Step 714, the space manager identifies one or more sparse virtual space segments associated with the requested data. In one or more embodiments of the invention, as discussed in Step 700 above, the mapping request specifies the data using a file identifier and a file offset.

In one or more embodiments of the invention, the space manager uses the file identifier to identify a logical volume and a logical volume offset, within that logical volume, associated with file identifier. Once the logical volume offset is known, the sparse virtual space segment(s) associated with that file are similarly identified. Further, using the specified file offset, one or more sparse virtual space segments are identified and located that are specific to the data specified in the received mapping request. Accordingly, at this point, the space manager has located, in the sparse virtual space, the data specified in the mapping request.

In Step 716, the space manager identifies the pools mapped to the one or more sparse virtual space segments identified in Step 714. Further, in one or more embodiments of the invention, as the pools are categorized into two categories, memory pool(s) and persistent storage pool(s), the storage type of the requested data is similarly identifiable.

In Step 718, the space manager determines the storage type of the device on which the requested data is located. As discussed in Step 716 above, in one embodiment of the invention, identifying the pool associated with the sparse virtual space segment is sufficient to determine the storage type of the device, as each pool is unique to the two types of storage (persistent storage and memory).

In one or more embodiments of the invention, mapping to a region of memory requires that data to be located on a byte-addressable device (i.e., memory). Accordingly, it is therefore not possible to establish a direct mapping to data physically located in persistent storage (stored in blocks). That is, persistent storage is not configured to support, and is therefore not suitable for, servicing mapping requests.

Accordingly, if the specified data of the mapping request is located in persistent storage, the requested data is relocated to a suitable device in order to establish the direct mapping. However, if the data is already located on a device that is suitable for direct memory mapping (i.e., memory), the current location of that data is therefore sufficient to service the request, without first moving the data.

If the requested data is located in persistent storage (718—NO), the process proceeds to Step 720. Alternatively, if the requested data is located in memory (718—YES), the process proceeds to Step 722.

In Step 720, the file system container initiates copying the data from persistent storage to memory. Specifically, in one or more embodiments of the invention, the space manager identifies the physical location of the requested data using the persistent storage pool(s). As described in FIG. 4 above, each identified persistent storage pool segment is associated with persistent storage segments that identify the physical locations of the requested data.

In one or more embodiments of the invention, once the physical location of the requested data is known, the space manager identifies available locations of memory to relocate the data. Specifically, the space manager may analyze one or more memory pools and/or the sparse virtual space to located regions of physical memory that are available (e.g., includes sufficient free space) to copy to the requested data. The exact type of memory chosen to relocate the data is irrelevant, in one or more embodiments of the invention, the only relevant characteristic of the new memory device is that byte-level manipulation be possible, thereby allowing for direct virtual-to-physical address mapping.

In one or more embodiments of the invention, once the physical location of the requested data and the physical location of available memory are known, the space manager generates a copy command to copy the data from the data's location in persistent storage to the new location in memory. Further, in one embodiment of the invention, as the requested data is stored in blocks in persistent storage, every block that includes the requested data will have to be copied, even though those blocks may contain other, non-requested data. However, the copy command issued by the space manager ensures only the requested data is copied to memory, and not all of the data from each entire block identified in persistent storage.

Accordingly, in one or more embodiments of the invention, once the copy command is generated by the space manager, the file system container forwards that command to the OS to initiate copying of the data from persistent storage to memory.

In Step 722, the file system container informs the OS of the virtual-to-physical address mapping. In one or more embodiments of the invention, once a physical address of the memory is known, the space manager generates a virtual-to-physical address mapping using the virtual address received with the mapping request and the physical address identified in the memory pool.

In one or more embodiments of the invention, once the virtual-to-physical address mapping is generated, the space manager initiates sending the virtual-to-physical address mapping to the OS (to ultimately inform the MMU).

Figure 8A:
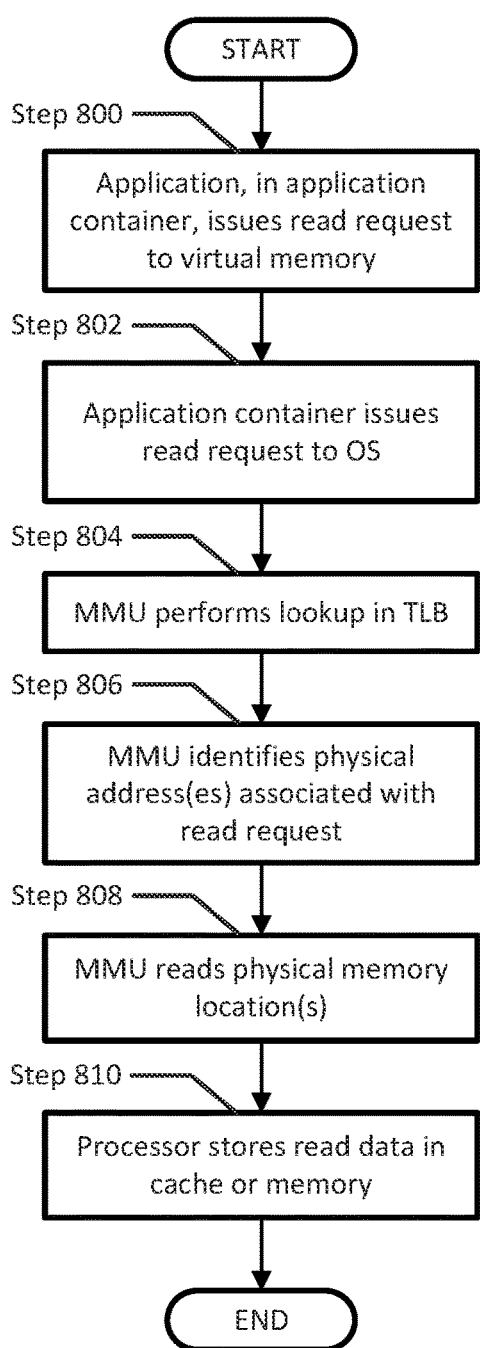
FIG. 8A shows a flowchart of a method of directly reading data in accordance with one or more embodiments of the invention.

FIG. 8A shows a flowchart of a method for directly accessing a region of memory, in accordance with one or more embodiments of the invention. All or a portion of the method shown in FIG. 8A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 800, an application issues a read request to the virtual address space of that application. In one or more embodiments of the invention, the read request specifies the virtual address space segment (e.g., virtual address) of the virtual address space. Further, in one embodiment of the invention, the application is aware that a memory mapping exists for the virtual address space segments being utilized.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 802, the application container, to which the application belongs, forwards the read request to the OS. In one or more embodiments of the invention, although the application issued the read request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 804, the MMU of the hardware layer performs a lookup in the TLB to identify a physical address associated with the specified virtual address. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 806, the MMU identifies the physical address(es) associated with the virtual address of the read request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 808, the MMU reads the data at the physical addresses specified by the TLB. In one or more embodiments of the invention, the MMU transmits that data to one or more processors (and the cache therein) for temporary storage while being read by the application.

In Step 810, one or more processors receives the data from memory, via the MMU. In one or more embodiments of the invention, a processor stores that data in the cache local to the processor for more rapid reading and manipulation. Further, once in cache, the processor may provide the data to the application, as initially requested.

Figure 8B:
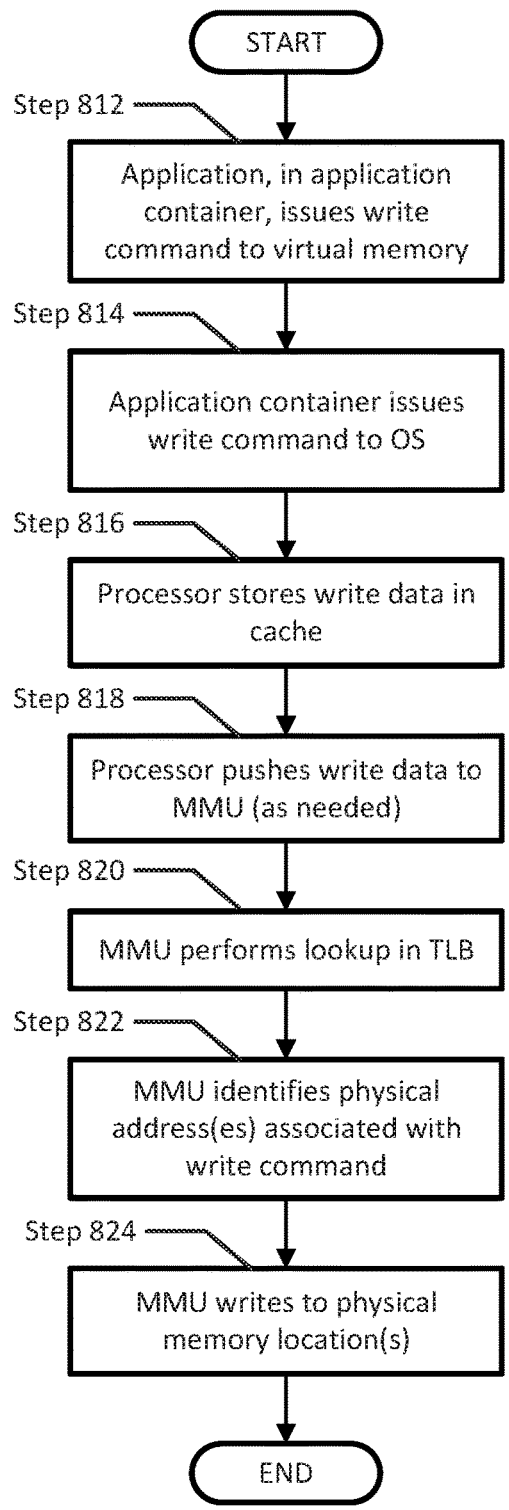
FIG. 8B shows a flowchart of a method of directly writing data in accordance with one or more embodiments of the invention.

FIG. 8B shows a flowchart of a method for directly writing to a region of memory, in accordance with one or more embodiments of the invention. All or a portion of the method shown in FIG. 8B may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 812, an application issues a write request to store new data in the virtual address space of that application (or overwrite/modify existing data in the virtual address space). In one or more embodiments of the invention, the write request specifies the virtual address space segment (e.g., virtual address) of the virtual address space and the data to be written to the associated virtual address space segment. Further, in one embodiment of the invention, the application is aware that a memory mapping exists for the utilized virtual address space segments.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 814, the application container, to which the application belongs, forwards the write request to the OS. In one or more embodiments of the invention, although the application issued the write request to the virtual address space of the application, such internal requests ultimately trigger external commands to the underlying OS so that the request to the virtual address space may be reflected in the hardware devices of the node.

In one or more embodiments of the invention, the application container forwards the request, unaltered to the OS of the node. Alternatively, in one embodiment of the invention, the application container may modify the request prior to forwarding, for example, by translating the virtual address specified by the application to another virtual address (in the event of a known conflict) and/or otherwise modify the request to conform with the operations of the node.

In Step 816, the processor writes the requested data to the cache. In one or more embodiments of the invention, the processors receives the write request issued by the application and processes that new data (or changes to existing data) in the local cache of the processor. That is, even though the application specified a virtual address which is mapped to a physical address of memory, the processor may first internally stores and processes the changes requested by the application. In one embodiment of the invention, when data is located in cache, instead of its intended location in memory and/or persistent storage, that data may be considered "uncommitted" or "dirty". Further, in one embodiment of the invention, the application is unaware of whether the data sent in the write request is stored in cache or in the intended physical location of memory (associated with the virtual address).

In Step 818, the processor initiates of copy of the new data (of the write request) to memory via the MMU. In one or more embodiments of the invention, the cache is a limited resource (e.g., little total space) and may therefore reach a maximum capacity more quickly than other devices of the hardware layer. In the event the cache is determined to be too full, the processor begins copying certain data from the internal cache to the location originally specified by the request. The determination of which data in the cache to copy to memory may be based on one or more characteristics including, but not limited to, which data is least recently used, which data is least frequently used, and/or any other characteristic for determining which data may be least useful to maintain in cache. In one or more embodiments of the invention, the processor issues a write request to the MMU that includes the modified data and the virtual address specified by the application.

Further, in one embodiment of the invention, the application is unaware of when the processor copies data from cache to memory resulting from a determination that the cache is too full. And, therefore, the application is unaware of whether the data sent in the write request is stored in cache or in the intended physical location of memory (associated with the virtual address).

In Step 820, the MMU of the hardware layer performs a lookup in the TLB to identify a physical address associated with the specified virtual address of the write request. In one or more embodiments of the invention, as described above in Step 604, when a request to access or modify memory is sent to the MMU, using a virtual address, the MMU may perform a lookup in the TLB to find a physical address associated with the provided virtual address (e.g., a virtual-to-physical address mapping).

In Step 822, the MMU identifies the physical address(es) associated with the virtual address of the write request. Specifically, in one embodiment of the invention, where the application had already established a direct mapping (e.g., the process of FIGS. 7A and 7B), the MMU locates the already-existing virtual-to-physical address mapping in the TLB. However, if for some reason, the virtual-to-physical address mapping does not exist in the TLB, the MMU initiates a page fault and the process described in Steps 704-710 are performed.

In Step 824, the MMU copies the data of the write request to the physical addresses specified in the TLB. In one or more embodiments of the invention, after the MMU finishes copying the data to memory, the MMU informs the processor of a successful write. Further, in one embodiment of the invention, the processor may consequently inform the OS that the data was successfully copied to memory, and the OS may inform the application that the data was successfully written to memory.

Figure 9A:
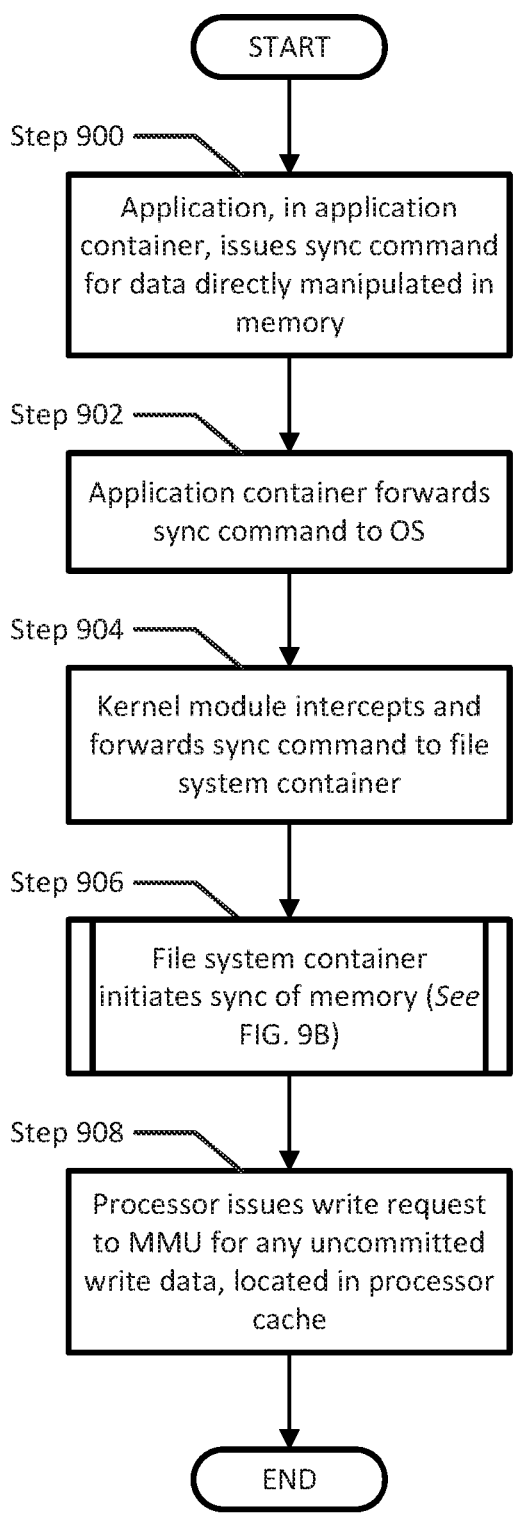
FIG. 9A shows a flowchart of a method of committing data in accordance with one or more embodiments of the invention.

FIG. 9A shows a flowchart of a method for syncing data changes of a memory mapped region, in accordance with one or more embodiments of the invention. All or a portion of the method shown in FIG. 9A may be performed by one or more components of the node. While the various steps in this flowchart are presented and described sequentially, one of ordinary skill in the relevant art will appreciate that some or all of the steps may be executed in different orders, may be combined or omitted, and some or all steps may be executed in parallel.

In Step 900, an application issues a sync command for data that has been directly manipulated in memory. In one or more embodiments of the invention, the application is unaware as to whether the data sent in previous write requests has been persisted (e.g., copied) to the physical address(es) of memory associated with the virtual address (es) of the write requests (e.g., whether that data is uncommitted). Accordingly, to force the potentially uncommitted data to be committed (i.e., copied to memory, e.g., PMem), the application may issue a sync command to instruct the processor to force any uncommitted data, located in cache, to memory.

In one or more embodiments of the invention, as described in FIG. 1 above, the application may be executing within an application container that has the ability to access the OS of the node. Thus, when an application, isolated in an application container, issues a request to an internal virtual address space, the application container must handle that command before interacting with the OS.

In Step 902, the application container, to which the application belongs, forwards the write request to the OS. In one or more embodiments of the invention, the application container forwards the command, unaltered to the OS of the node. Alternatively, in one embodiment of the invention, the application container may modify the command prior to forwarding, for example, by translating the virtual address specified by the application to another virtual address (in the event of a known conflict) and/or otherwise modify the command to conform with the operations of the node.

In Step 904, the kernel module of the OS intercepts and forwards the sync command to the file system container of the node. In one or more embodiments of the invention, in contrast to Steps 606 and 706, the kernel module intercepts the sync command from the application before being passed to the hardware layer of the node. Specifically, in one embodiment of the invention, the kernel module is configured to identify sync commands and redirect those commands to a new destination (i.e., the file system container).

In Step 906, the file system container, having received and processed the sync command forwarded by the kernel module, re-initiates the sync process by forwarding one or more sync commands back to the OS. More details of the process of Step 906 are discussed in relation to FIG. 9B below.

In Step 908, the processor receives the sync command and initiates the copying of the relevant uncommitted data to memory. In one or more embodiments of the invention, the processor identifies the data associated with the sync command and initiates the copying of the identified data, to memory. As described in Steps 820, 822, and 824 above, the MMU receives the write request, perform a lookup in the TLB, identify the associated physical address(es) in memory for the write request, copy the uncommitted data to the associated physical address(es), then inform the processor of the successful writing of the data. In turn, in one embodiment of the invention, the processor then informs the OS of the successful writing of the data indicated by the sync command to memory; and the OS informs the application that the data was successfully written to memory.

Figure 9B:
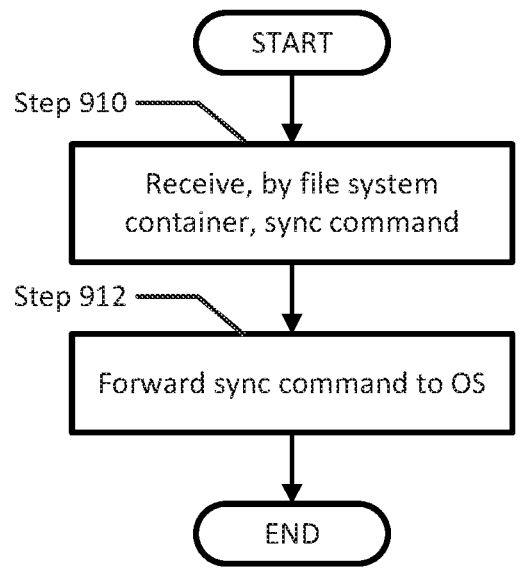
FIG. 9B shows a flowchart of a method of servicing a sync command in accordance with one or more embodiments of the invention.

FIG. 9B shows a flowchart of a method for servicing a sync command, in accordance with one or more embodiments of the invention. All or a portion of the method shown in FIG. 9B may be performed by the file system container and/or the space manager thereof. While the various steps in this flowchart are presented and described sequentially, one of ordinary skill in the relevant art will appreciate that some or all of the steps may be executed in different orders, may be combined or omitted, and some or all steps may be executed in parallel.

In Step 910, the file system container receives a sync command for data that was being directly manipulated by the application. In one or more embodiments of the invention, the space manager may modify the sync command consistent with the physical addresses identified in one or more memory pool(s). Further, the sync command may be modified such that the kernel module will not, again, intercept the sync command when traversing the OS. In one embodiment of the invention, if one or more memory pool segments associated with the sync command are associated with two or more memory segments, the space manager may generate additional sync commands to duplicate the changes in data to those additional memory segments.

In Step 912, the file system container forwards the sync command(s) to the OS in order to commit the data, located in cache, to memory. In one or more embodiments of the invention, the sync command may be the same sync command as originally received by the file system container, or alternatively be modified consistent with the one or more determinations of Step 910.

Figure 10:
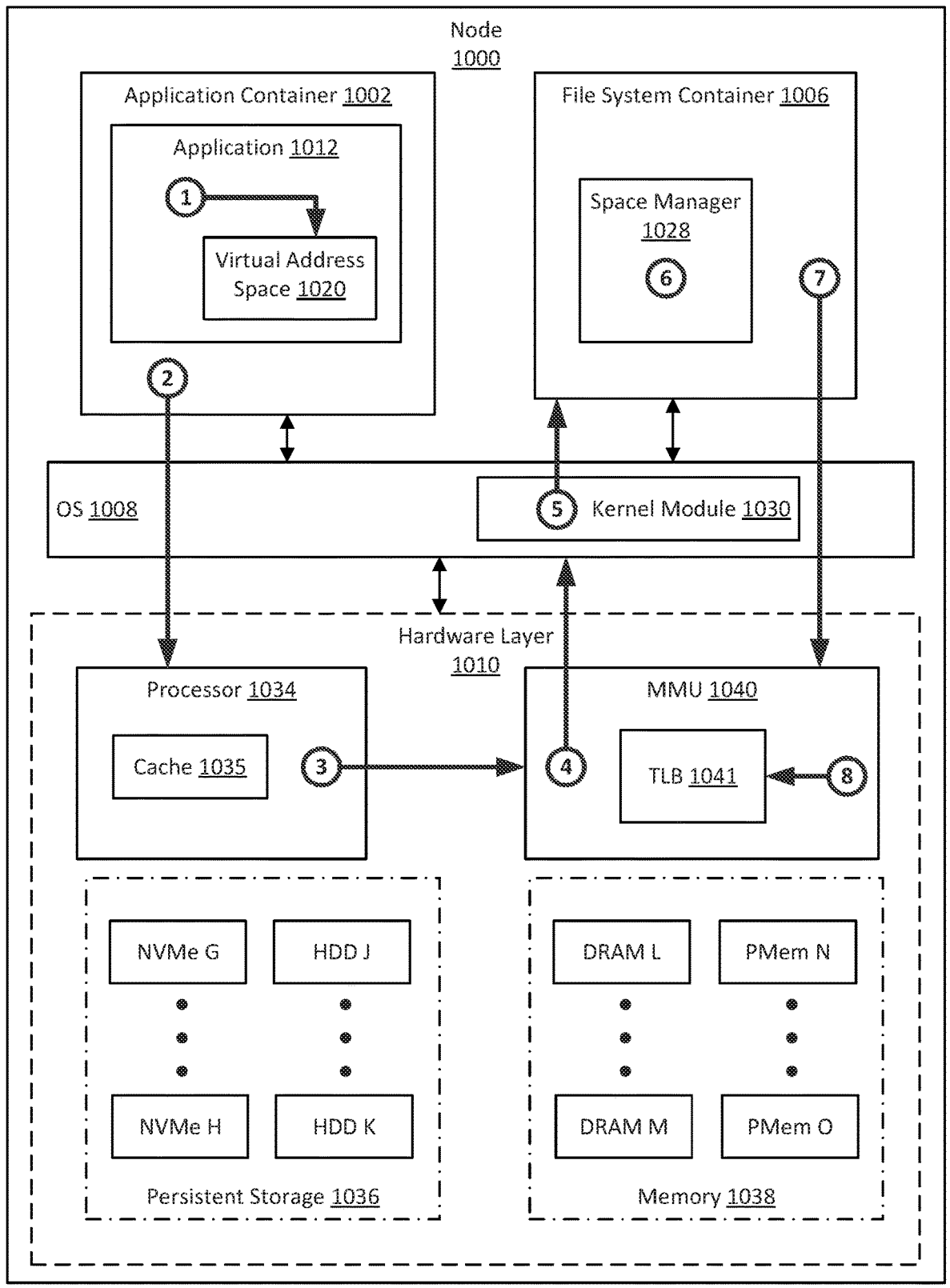
FIG. 10 shows an example in accordance with one or more embodiments of the invention.

FIG. 10 shows an example in accordance with one or more embodiments of the invention. The following use case is for explanatory purposes only and not intended to limit the scope to this embodiment.

In FIG. 10, consider a scenario in which, at (1), application (1012) issues a mapping request for data in virtual address space (1020) to establish direct access to memory (1038). The mapping request specifies a virtual address of the virtual address space (1020) and specific data using a file identifier and a file offset.

At (2), application container (1002) forwards the mapping request to the OS (1008). Here, the application container (1002) forwards the request, unaltered to the OS (1008) of the node (1000). Further, the OS (1008) passes the mapping request to hardware layer (1010) of the node (1000) without any additional processing.

At (3), the processor (1034) receives the mapping request in the hardware layer (1010) and forwards the request to the MMU (1040). At (4), the MMU (1040) performs a lookup in TLB (1041) to locate a physical address associated with the virtual address of the mapping request. However, the TLB (1041) does not contain a virtual-to-physical address mapping for the specified virtual address. Accordingly, the MMU (1040) issues a page fault to the OS (1008) that includes the mapping request.

At (5), the kernel module (1030) detects a page fault in the OS (1008) and interrupts normal handling of the page fault by the OS (1008). Specifically, the kernel module (1030) intercepts the page fault and forwards the mapping request (of the page fault) to the file system container (1006).

At (6), the space manager (1028) of the file system container (1006) receives the mapping request and locates the file in the sparse virtual space by analyzing the file identifier to identify a logical volume and a logical volume offset, within that logical volume, associated with file identifier. Once the logical volume offset is known, the sparse virtual space segments associated with that file are similarly identified. Further, using the specified file offset, the space manager (1028) identifies and locates the sparse virtual space segment specific to the data specified in the received mapping request.

Further, at (6), the space manager (1028) identifies that the sparse virtual space segment is associated with memory pool segment, which in turn, is directly associated with a memory segment (and corresponding physical address). The space manager (1028) then generates and initiates the transmission of a virtual-to-physical address mapping that specifies the virtual address of the mapping request and the physical address identified from the memory pool segment.

At (7), the file system container (1006) forwards the virtual-to-physical address mapping to the MMU (1040). In one or more embodiments of the invention, the file system container (1006) transmits the virtual-to-physical address mapping to hardware layer (1010) via the OS (1008).

At (8), the MMU (1040) writes a new entry to the TLB (1041) corresponding to the virtual-to-physical address mapping received from the file system container (1006). After the MMU (1040) writes the entry into the TLB (1041), the MMU (1040) additionally informs the OS (1008) that the memory mapping was successful. In turn the OS (1008) informs the application container (1002) and the application (1012) that the memory mapping request was successfully serviced and direct access has been established.

Figure 11:
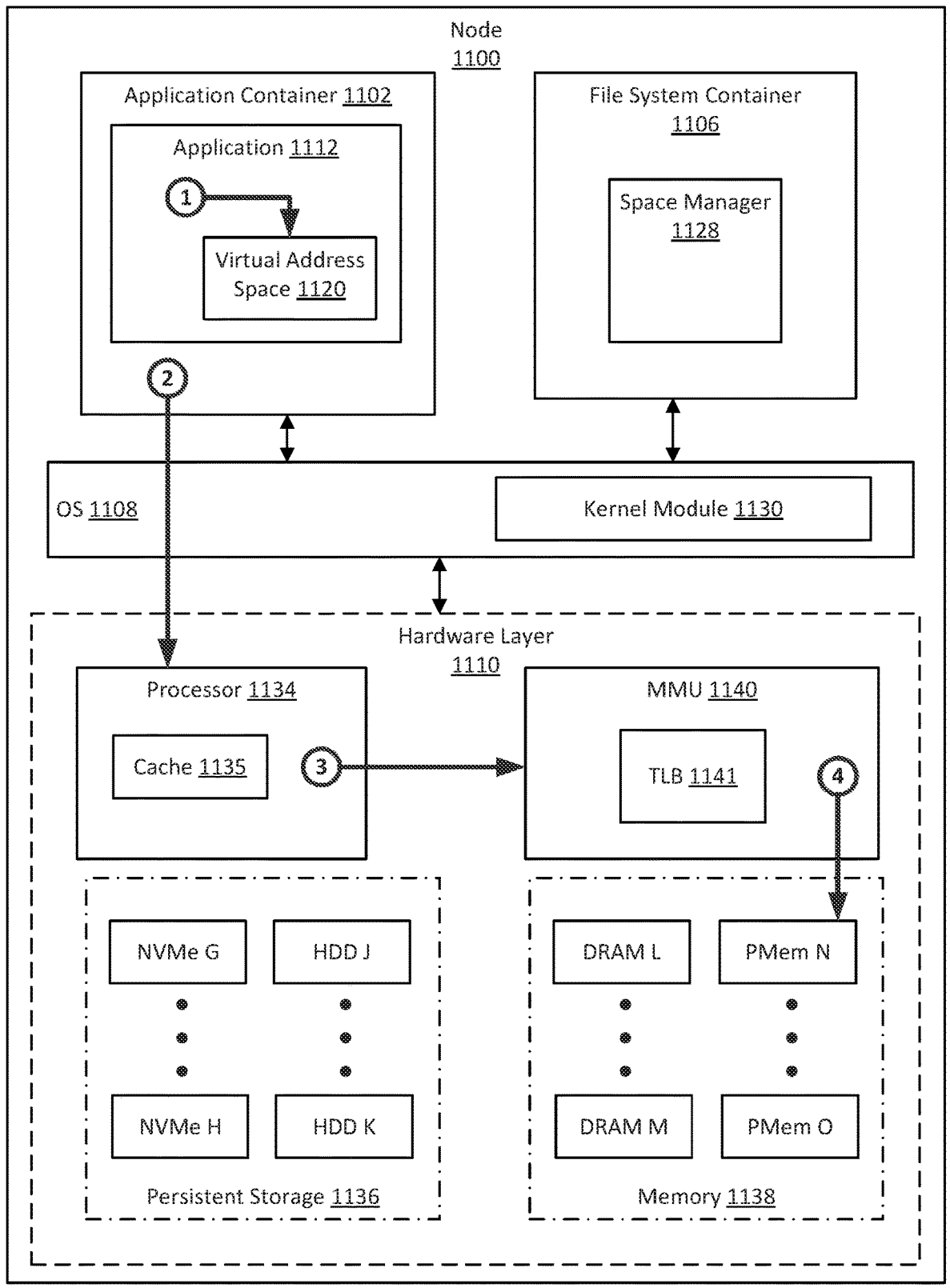
FIG. 11 shows an example in accordance with one or more embodiments of the invention.

FIG. 11 shows an example in accordance with one or more embodiments of the invention. The following use case is for explanatory purposes only and not intended to limit the scope to this embodiment.

In FIG. 11, consider a scenario in which, at (1), application (1112) issues a write request to overwrite existing data in virtual address space (1120) for which direct access to memory (1138) has already been established. The write request specifies a virtual address and the changes to the data.

At (2), application container (1102) forwards the write request to the OS (1108). Here, the application container (1002) forwards the request, unaltered to the OS (1108) of the node (1100). Further, the OS (1108) passes the write request to hardware layer (1110) of the node (1100) without any additional processing.

At (3), the processor (1134) receives the write request in the hardware layer (1110), stores the data changes to cache (1135), and forwards the request to the MMU (1140). At (4), the MMU (1140) performs a lookup in TLB (1141) to locate a physical address associated with the virtual address of the mapping request. The TLB (1141) then successfully identifies and returns to the MMU (1140) the physical address associated with the virtual address. The MMU (1140) then copies the data changes from cache (1135) to the physical location in memory (1138) specified by the physical address found in the TLB (1141). Specifically, in this case, the data is written to some portion of PMem N.

Figure 12:
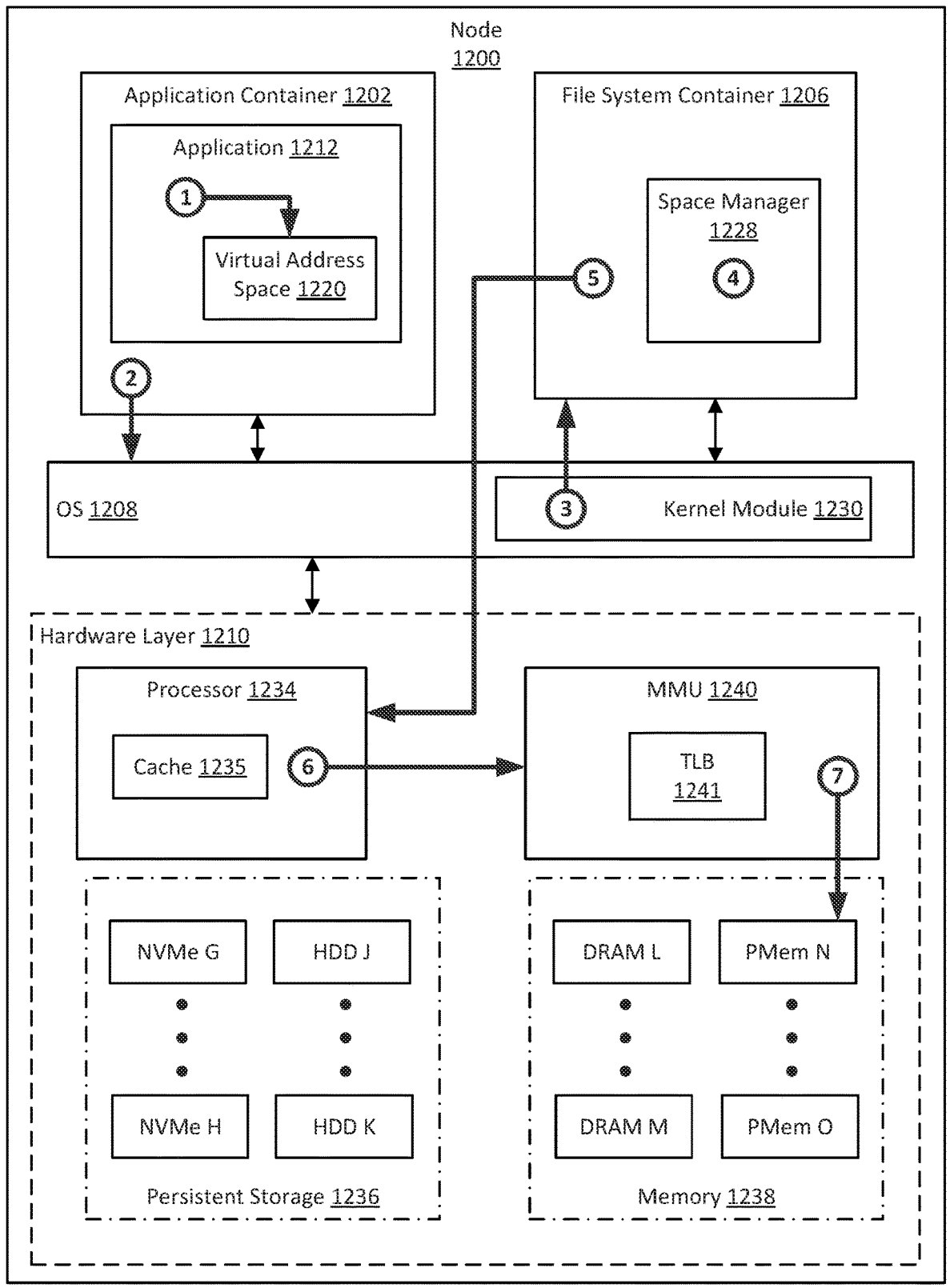
FIG. 12 shows an example in accordance with one or more embodiments of the invention.

FIG. 12 shows an example in accordance with one or more embodiments of the invention. The following use case is for explanatory purposes only and not intended to limit the scope to this embodiment.

In FIG. 12, consider a scenario in which, at (1), application (1212) issues a sync command for data being manipulated in the virtual address space (1220) via direct access to memory (1238). The sync command specifies a virtual address of the virtual address space (1220) and the modified data.

At (2), application container (1002) forwards the sync command to the OS (1208). Here, the application container (1202) forwards the request, unaltered to the OS (1208) of the node (1200). At (3), the kernel module (1230) detects the sync command in the OS (1208) and interrupts normal handling of the sync command by the OS (1208). Specifically, the kernel module (1230) intercepts the sync command and forwards the sync command to the file system container (1206).

At (4), the space manager (1228) of the file system container (1206) receives the sync command and identifies each memory segment affected by the sync command. Then, after identifying that PMem N is only affected memory (1238) device, space manager (1228) analyzes the sync command to ensure that the sync command properly specifies copying data to correct physical locations. The space manager (1228) then regenerates the sync command consistent with the physical locations identified in the memory pool.

At (5), the file system container (1206) forwards the sync command to the processor (1234) through OS (1208). At (6), processor (1234) receives the sync command and identifies all relevant uncommitted data associated with the sync command, in cache (1235), to be copied to memory (1238). Processor (1234) then initiates copying the identified uncommitted data to memory by sending a write request to the MMU (1240) to copy the data to memory (1238).

At (7), the MMU (1240) performs a lookup in TLB (1241) to locate a physical address associated with the virtual address of the write request from the processor (1234). The TLB (1241) then successfully identifies and returns, to the MMU (1240), the physical address associated with the virtual address. The MMU (1240) then copies the data from cache (1235) to the physical location in memory (1238) specified by the physical address found in the TLB (1241). Specifically, in this case, the data is written to some portion of PMem N.

In general, embodiments of the invention relate to systems, devices, and methods for implementing segment allocation in a sparse virtual space. Specifically, embodiments of the invention relate to using a sparse virtual space sector manager to identify available sparse virtual space segments using an available space tracking metadata hierarchy and to reserve the identified sparse virtual space segments for writing new data from an application.

Figure 13:
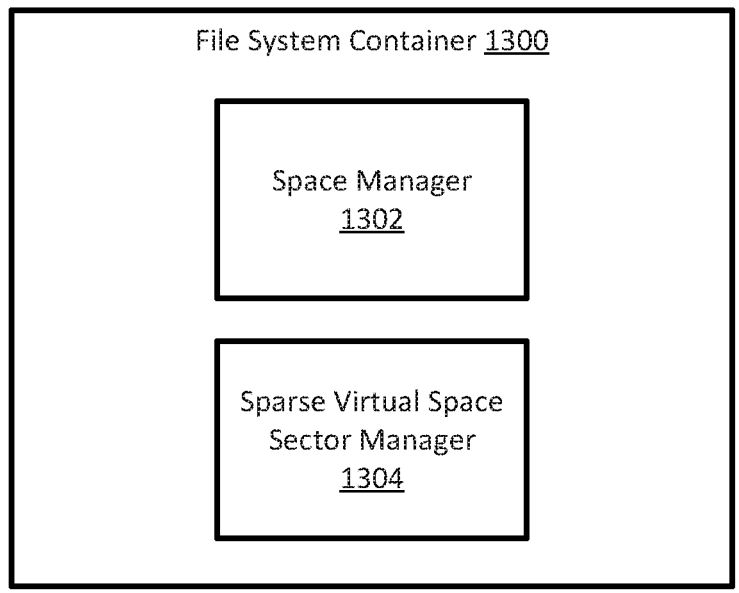
FIG. 13 shows an example of a file system container in accordance with one or more embodiments of the invention.

FIG. 13 shows an example of a file system container in accordance with one or more embodiments of the invention. In one embodiment of the invention, the file system container (1300) includes a space manager (1302) and a sparse virtual space sector manager (1304). Similarly named parts shown in FIG. 13 have all of the same properties and functionalities as described above in FIG. 2 and FIG. 1. Accordingly, only additional properties and functionalities will be described below.

In one embodiment, the sparse virtual space sector manager (1304) is software executing within the file system container (1300), that may include instructions which, when executed, initiate operations of one or more components in the hardware layer (discussed above).

In one or more embodiments of the invention, the sparse virtual space sector manager (1304) manages block allocations for data in the sparse virtual space. The sparse virtual space sector manager (1304) may include functionality to obtain requests to write data to the sparse virtual space and to allocate one or more sparse virtual space segments in accordance with the method illustrated in FIG. 18 to service such requests.

Figure 14:
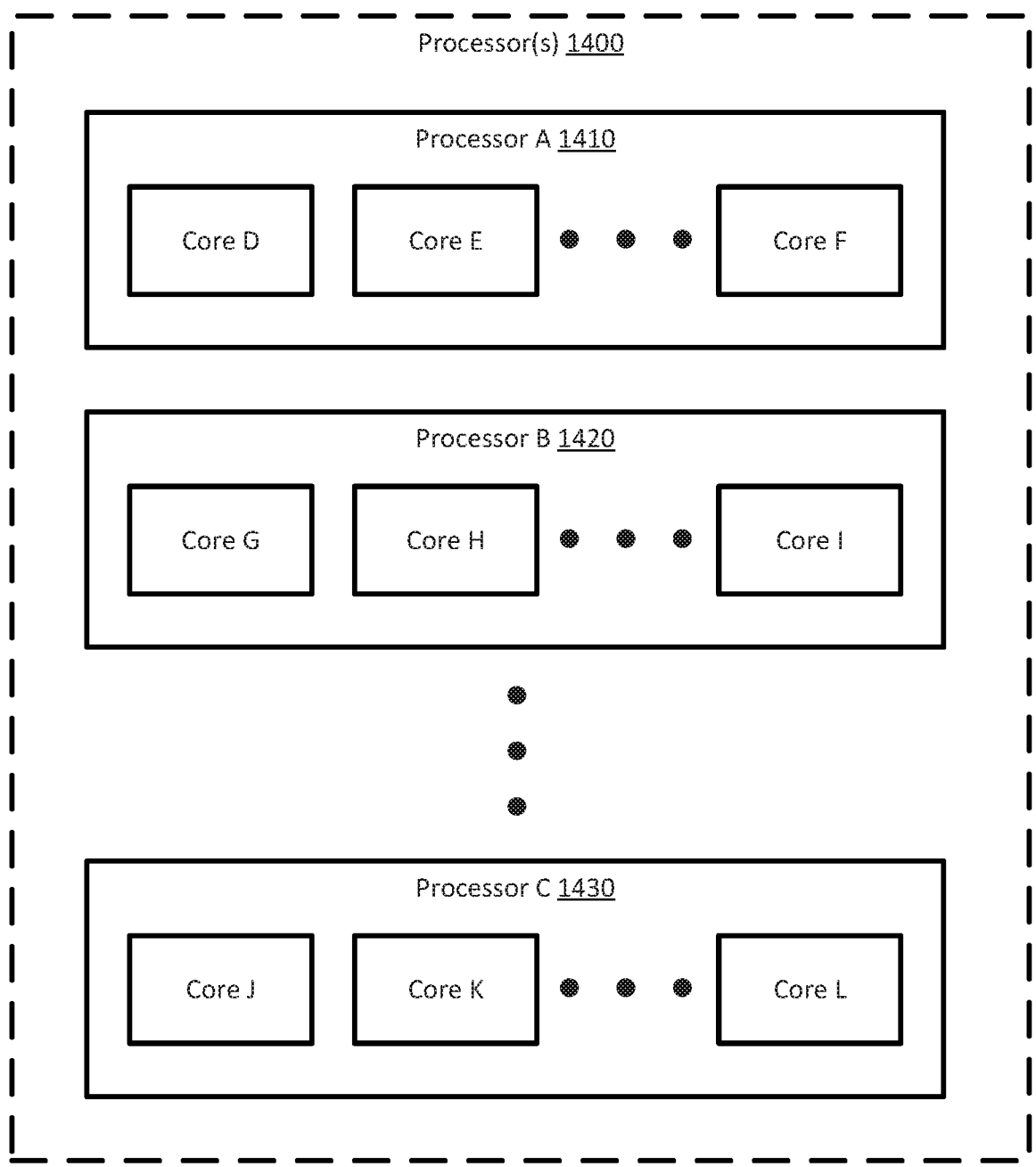
FIG. 14 shows a diagram of one or more processors in accordance with one or more embodiments of the invention.

FIG. 14 shows a diagram of one or more processors in accordance with one or more embodiments of the invention. The processors (1400) may be processors of the hardware layer discussed above. Each processor (1410, 1420, 1430) may be an integrated circuit for processing instructions of components in the node (e.g., 200, FIG. 2; 300, FIG. 3) discussed above. Each processor (1410, 1420, 1430) may include one or more cores (e.g., 1410, 1420, 1430). Each processor may include additional, fewer, and/or different components without departing from the invention.

In one or more embodiments of the invention, each core includes functionality for processing instructions. Multiple cores in the processors (1400) may each process an instruction(s) in parallel to other cores in the same processor and/or parallel to other cores in other processors. For example, a core D of processor A (1410) may perform execute an instruction in parallel to and independent from a core E of processor A (1410) and in parallel to and independent from a core G in processor B (1420), each of which may also be concurrently executing instructions.

Figure 15:
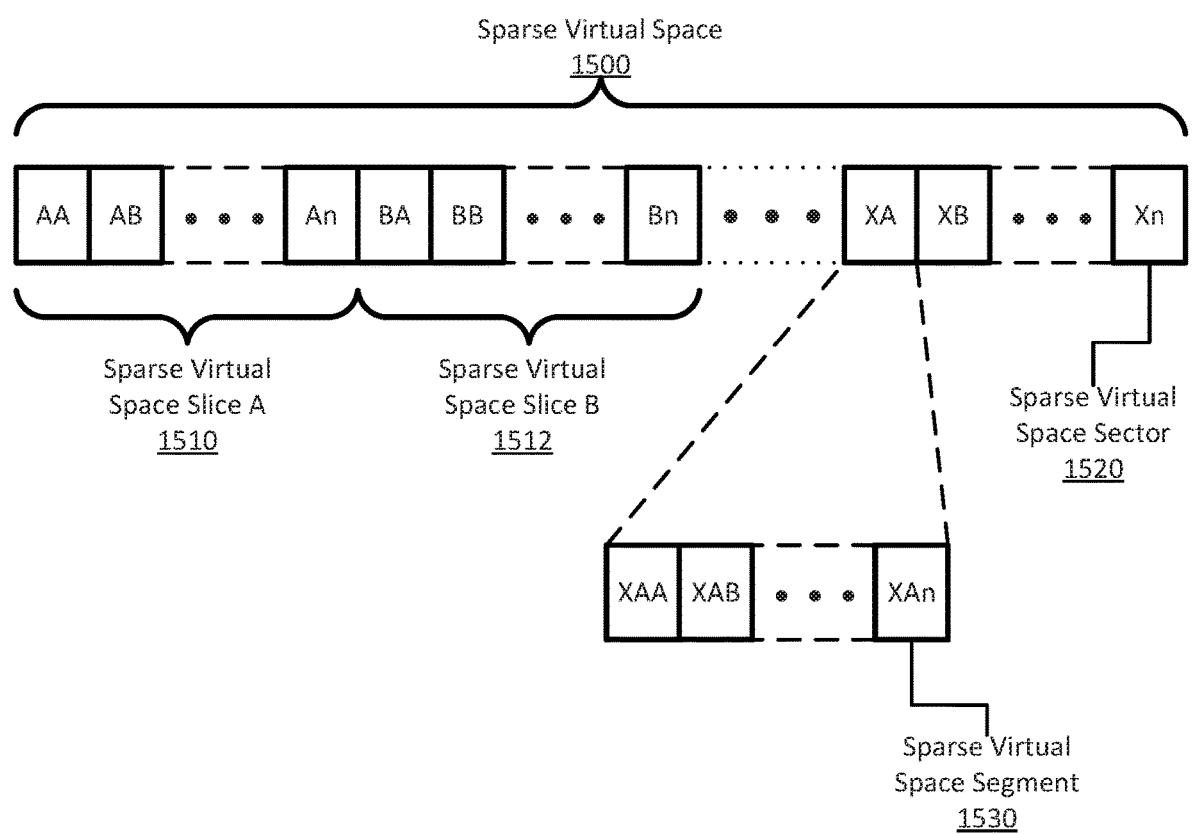
FIG. 15 shows a diagram of a sparse virtual space in accordance with one or more embodiments of the invention.

FIG. 15 shows a diagram of a sparse virtual space in accordance with one or more embodiments of the invention. As discussed above, the sparse virtual space (400) may be a sparse, virtual data structure that provides a comprehensive layout and mapping of data managed by the file system container of the node. In one embodiment of the invention, the sparse virtual space (1500) may be divided into sparse virtual space sectors (e.g., 1520). Each sparse virtual space sector may be further divided into sparse virtual space segments (e.g., 1530). Additionally, the sparse virtual space sectors may be grouped into sparse virtual space slices (e.g., 1510, 1512). Further, the sparse virtual space slice may be grouped into sparse virtual space slice groups (not shown). Similarly named parts shown in FIG. 15 have all of the same properties and functionalities as described above in FIG. 4. Accordingly, only additional properties and functionalities will be described below.

In one or more embodiments of the invention, each of the groupings and divisions of the smaller virtual sub-regions of the sparse virtual space (1500) (e.g., the sparse virtual space segments, sparse virtual space sectors, sparse virtual space slices, and the sparse virtual space slice groups), and the relative levels and/or associations of each of the smaller virtual sub-regions, may be tracked using an available space tracking metadata hierarchy (discussed below). The available space tracking metadata hierarchy may be a data structure that tracks the allocation of the sparse virtual space segments. In other words, the available space tracking metadata specifies whether a sparse virtual space segment is available for use for new data to be stored.

While the sparse virtual space (1500) is shown as being organized in the aforementioned four-level hierarchy, the invention is not limited to the aforementioned four-level hierarchy; rather, the invention may be implemented using any number of levels in the hierarchy.

Figure 16:
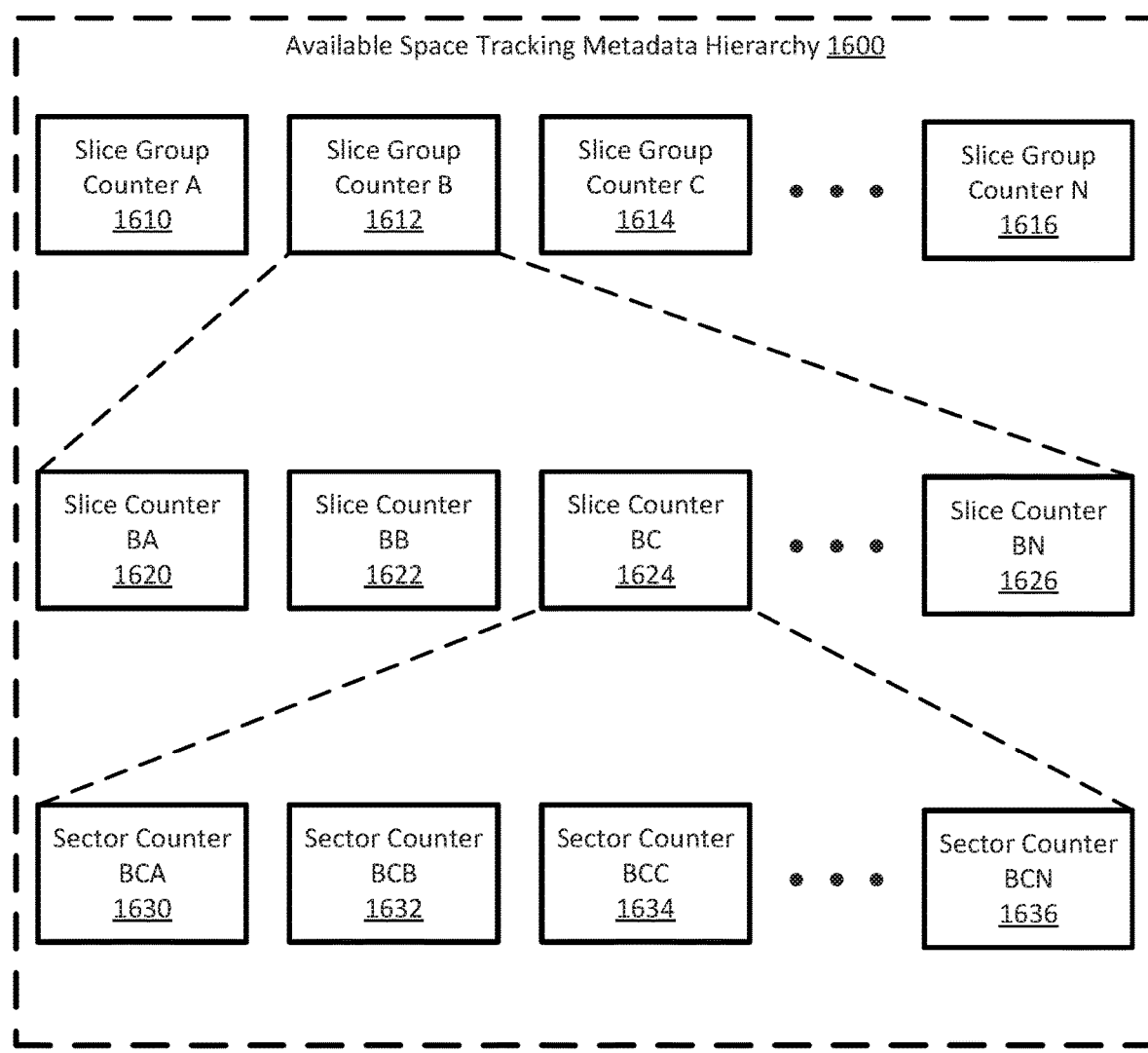
FIG. 16 shows a diagram of an available space tracking metadata hierarchy in accordance with one or more embodiments of the invention.

FIG. 16 shows a diagram of an available space tracking metadata hierarchy in accordance with one or more embodiments of the invention. In one or more embodiments of the invention, the available space tracking metadata hierarchy (1600) is a data structure that tracks the availability of segments in the sparse virtual space. The available space tracking metadata hierarchy (1600) may be organized into levels. Each level may be associated with (either directly or indirectly) one or more groupings and/or divisions of lower levels in the available tracking metadata hierarchy (1600). The available space tracking metadata hierarchy (1600) may be organized via other mechanisms without departing from the invention.

In one or more embodiments of the invention, a first level of the available space tracking metadata hierarchy (1600) is associated with slice group counters. In one or more embodiments of the invention, a slice group counter (1610, 1612, 1614, 1616) is associated with a sparse virtual space slice group discussed above. In one or more embodiments of the invention, the slice group counters (1610, 1612, 1614, 1616) are each a numerical value that specify a number of sparse virtual space segments in the associated sparse virtual space slice group that are available (also referred to as "not allocated") for use to store new data. Alternatively, the slice group counters (1610, 1614, 1616) may specify a number of sparse virtual space segments in the associated sparse virtual space slice group that are not available (also referred to as "allocated") for use to store new data. Each slice group counter may be directly associated with one or more slice counters (1620, 1622, 1624, 1626).

The slice group counters (1610, 1612, 1614, 1616) may each be directly associated with one or more slice counters (1620, 1622, 1624, 1626). The slice group counters (1610, 1612, 1614, 1616) may specify a sum of the directly-associated slice counters (1620, 1622, 1624, 1626).

In one or more embodiments of the invention, a second level of the available space tracking metadata hierarchy (1600) is associated with slice counters. In one or more embodiments of the invention, a slice counter (1620, 1622, 1624, 1626) is associated with a sparse virtual space slice, discussed above. In one or more embodiments of the invention, the slice counters (1620, 1622, 1624, 1626) are each a numerical value that specify a number of sparse virtual space segments in the associated sparse virtual space slice that are available for use to store new data. Alternatively, the slice group counters (1610, 1614, 1616) may specify a number of sparse virtual space segments in the associated sparse virtual space slice that are not available for use to store new data. Each slice group counter may be directly associated with one or more sector counters (1620, 1622, 1624, 1626).

The slice counters (1620, 1622, 1624, 1626) may each be directly associated with one or more sector counters (1630, 1632, 1634, 1636). The slice counters (1620, 1622, 1624, 1626) may specify a sum of the directly-associated sector counters (1630, 1632, 1634, 1636).

In one or more embodiments of the invention, a third level of the available space tracking metadata hierarchy (1600) is associated with sector counters. In one or more embodiments of the invention, a sector counter (1630, 1632, 1634, 1636) is associated with a sparse virtual space sector, discussed above. In one or more embodiments of the invention, the sector counters (1630, 1632, 1634, 1636) are each a numerical value that specify a number of sparse virtual space segments in the associated sparse virtual space sector that are available for use to store new data. Alternatively, the slice group counters (1610, 1614, 1616) may specify a number of sparse virtual space segments in the associated sparse virtual space sector that are not available for use to store new data. Each sector group counter may be directly associated with one or more segment counters (not shown).

The sector counters (1610, 1612, 1614, 1616) may each be directly associated with one or more sparse virtual space segments. The sector counters (1630, 1632 1634, 1636) specify a sum of numerical values (discussed below) of the directly-associated sparse virtual space segments.

In one or more embodiments of the invention, a fourth level of the available space tracking metadata hierarchy (1600) is associated with sparse virtual space segments. In one or more embodiments of the invention, the sparse virtual space segments each specify a numerical value that is used to determine whether the associated sparse virtual space segment is available for use to store new data. The numerical value may be represented, for example, by a one or a zero.

Figure 17:
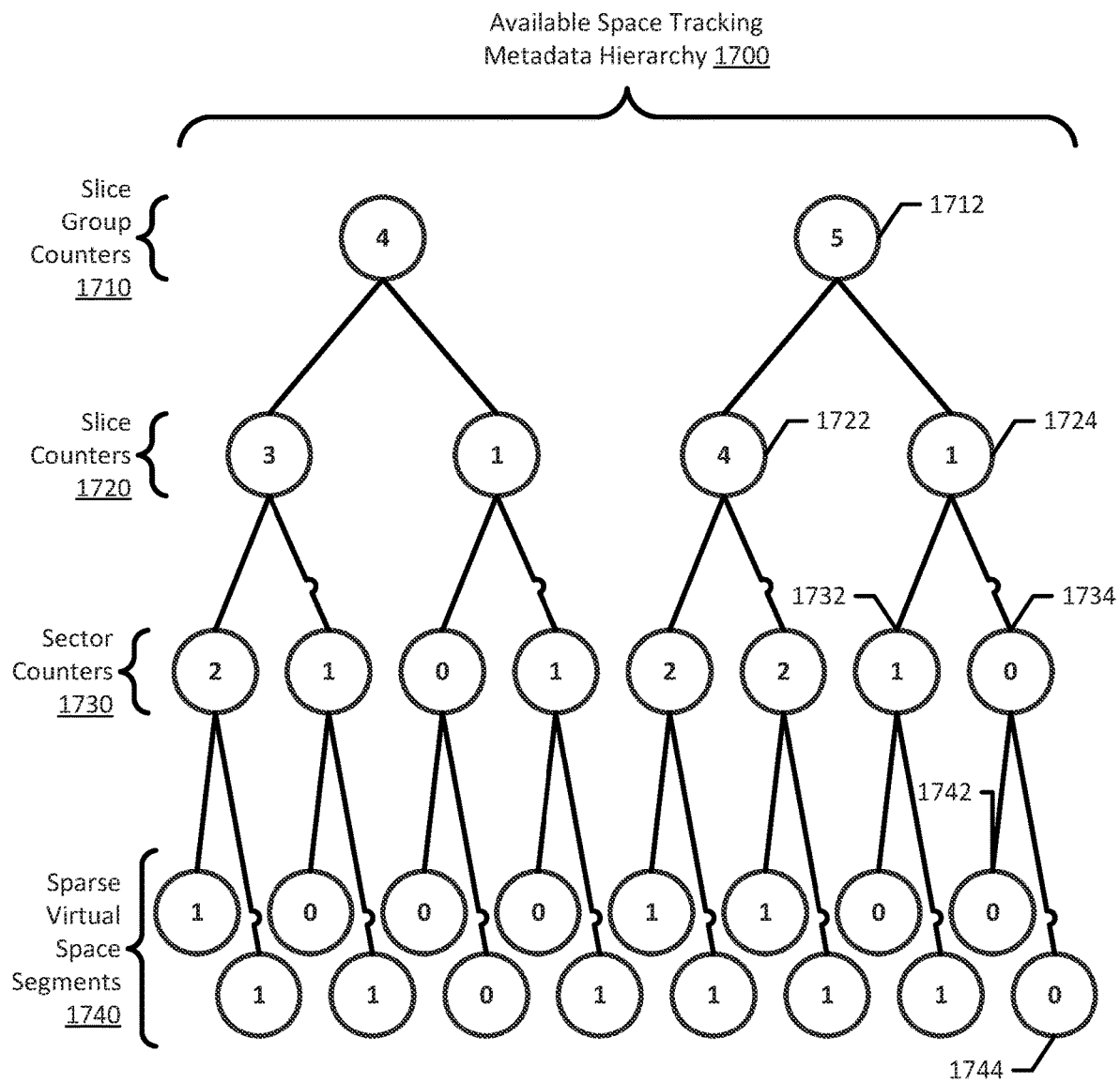
FIG. 17 shows an example of an available space tracking metadata hierarchy in accordance with one or more embodiments of the invention.

FIG. 17 shows an example of an available space tracking metadata hierarchy in accordance with one or more embodiments of the invention. The available space tracking metadata hierarchy (1700) includes two slice group counters (1710), each of which are directly associated with two slice counters (1720), each of which are directly associated with two sector counters (1730), each of which are directly associated with two sparse virtual space segments (1740).

In one or more embodiments of the invention, the available space tracking metadata hierarchy (1700) may be traversed by a sparse virtual space sector manager when allocating a sparse virtual segment in which data is to be stored. The available space tracking metadata hierarchy (1700) may be traversed by selecting a slice group counter (e.g., 1712) that specifies at least one available sparse virtual space segment (1740). The availability of at least one available sparse virtual space segment (1740) may be determined by the numerical value associated with the slice group counter (1710).

In this example, the number five is used to represent the total number of sparse virtual space segments that have been allocated. The number five may also represent the sum of the numerical values of the two directly associated slice counters (e.g., 1722, 1724). The slice group counters (1710) may further specify the total number of sparse virtual space segments associated with the slice group counters (1710). Returning to the example, this number (not shown) may be compared to the total number of sparse virtual space segments that have been allocated (e.g., five) to determine that the slice group counter (1712) is associated with available sparse virtual space segments.

After the determination is made, the available space tracking metadata hierarchy (1700) is further traversed to identify a slice counter (e.g., 1724) associated with the slice group counter (1712) that, similarly to the slice group counter (1710), specifies a numerical value of one that is associated with the number of allocated sparse virtual space segments associated with the identified slice counter (1724). The number one specified by the slice counter (1724) may also be associated with the sum of numerical values of the directly-associated sector counters (1732, 1734).

Continuing the traversal of the available space tracking metadata hierarchy (1700), a sector counter (e.g., 1734) is identified associated with the identified slice counter (1724). The sector counter (1734) specifies a numerical value of zero. The numerical value may represent the number of allocated sparse virtual space segments associated with the identified sector counter (1734).

To complete the traversal, a sparse virtual space segment (e.g., 1744) associated with the sector counter (1734) is selected. The sparse virtual space segment (1744) is selected based on the fact that the sparse virtual space segment (1744) has not yet been allocated.

Figure 18:
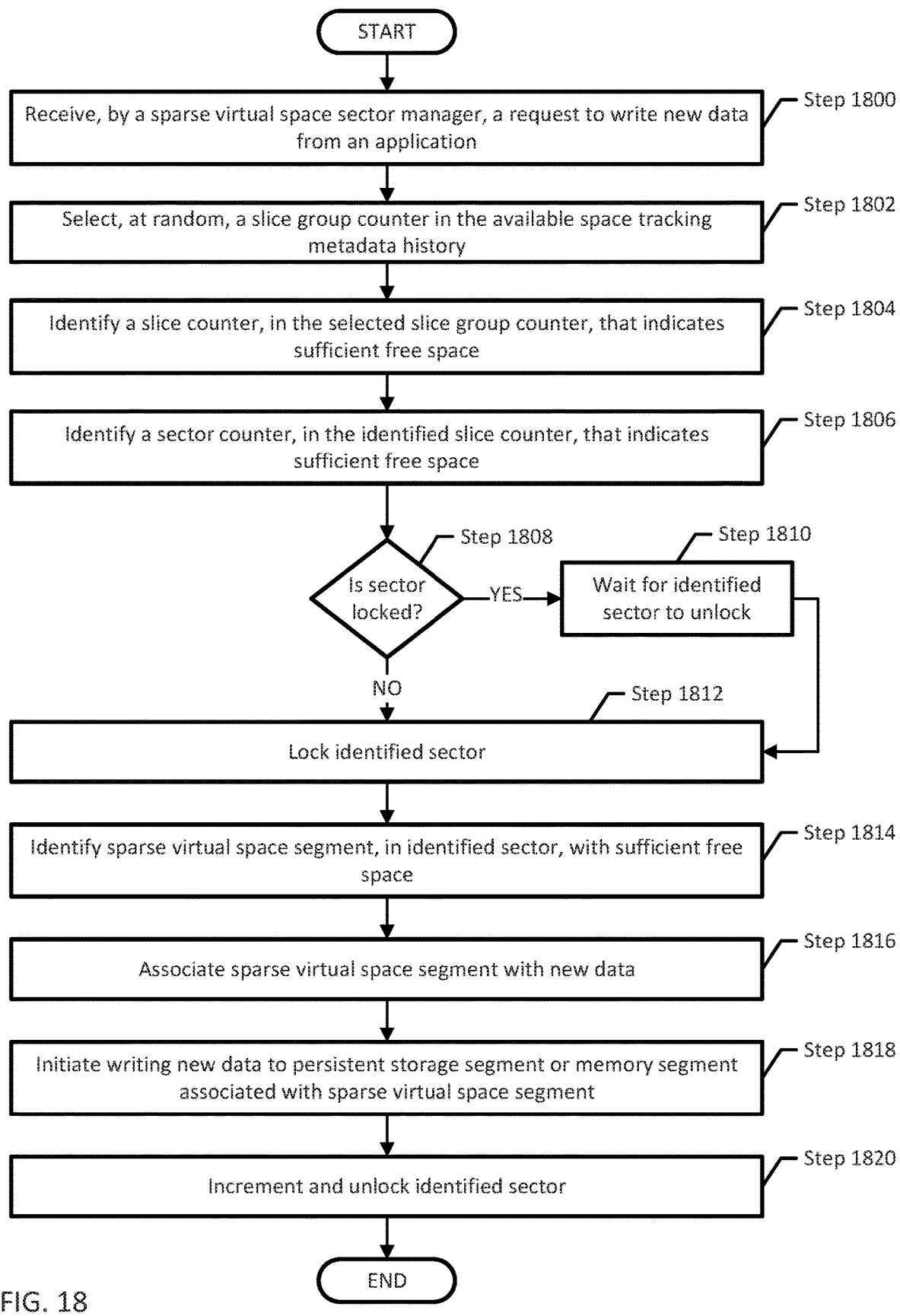
FIG. 18 shows a flowchart for writing data using an available space tracking metadata hierarchy.

FIG. 18 shows a flowchart for writing data using an available space tracking metadata hierarchy. All or a portion of the method shown in FIG. 18 may be performed by a sparse virtual space sector manager of a file system container via a processor. While the various steps in this flowchart are presented and described sequentially, one of ordinary skill in the relevant art will appreciate that some or all of the steps may be executed in different orders, may be combined or omitted, and some or all steps may be executed in parallel.

In step 1800, a request to write new data is obtained from an application. In one or more embodiments of the invention, the request is obtained directly from the application (as discussed above). Alternatively, the request is obtained from a kernel intercepting the request from an OS of the node in which the file system container is operating.

In step 1802, a slice group counter is selected in the available space tracking metadata hierarchy. In one or more embodiments of the invention, the slice group counter is selected at random. The slice group counter may specify, via for example, a numerical value, an availability of one or more sparse virtual space segments associated with the slice group counter.

In one or more embodiments of the invention, the slice group counter may be selected based on the number of available sparse virtual space segments associated with the slice group counter. For example, a slice group counter with the largest number of available sparse virtual space segments may be selected.

Other mechanisms may be used to select the slice group counter without departing from the invention.

In step 1804, a slice counter associated with the selected slice group counter that indicates sufficient free space is identified. In one or more embodiments of the invention, the slice counter indicates the free space via a numerical value that specifies a number of available (or unavailable) sparse virtual space segments associated with the slice counter. The slice counter may be identified using the numerical value.

In step 1806, a sector counter associated with the identified slice counter that indicates sufficient free space is identified. In one or more embodiments of the invention, the sector counter indicates the free space via a numerical value that specifies a number of available (or unavailable) sparse virtual space segments associated with the sector counter. The sector counter may be identified using the numerical value.

In step 1808, a determination is made about whether a sparse virtual space sector associated with the identified sector counter is locked. For example, the sparse virtual space sector may be locked by another processor performing the method of FIG. 18 concurrently and that has identified the same sector counter. If the sparse virtual space sector associated with the identified sector counter is locked, the method proceeds to step 1810; otherwise, the method proceeds to step 1812.

In step 1810, following the determination that the identified sector is locked, the sparse vector space sector manager waits for the sparse virtual space sector associated with the identified sector counter to unlock.

In step 1812, the sparse virtual space sector manager locks the sparse virtual space sector associated with the identified sector counter. The sparse virtual space sector manager may lock the sparse virtual space sector by embedding metadata to the sparse virtual space sector that specifies that the sparse virtual space sector is locked. In this manner, other processors performing the method of FIG. 18 may determine whether the sparse virtual space sector is locked using the embedded metadata.

In step 1814, a sparse virtual space segment associated with the identified sector counter is identified. The sparse virtual space segment may be identified by determining that the sparse virtual space segment includes sufficient space (e.g., the sparse virtual space segment has not been allocated).

In step 1816, the sparse virtual space segment is associated with the new data. In other words, the sparse virtual space segment is allocated to the new data of step 1800. Further, the sparse virtual space is updated to specify that the sparse virtual space segment is not available for use by other applications to store new data.

In step 1818, the sparse virtual space sector manager initiates writing the new data to a persistent storage segment or a memory segment associated with the identified sparse virtual space segment. In one or more embodiments of the invention, the sparse virtual space sector manager, via one or more processors, writes the data to a physical segment associated with the sparse virtual space segment.

In step 1820, the sparse virtual space sector associated with the identified sector counter is unlocked and incremented. In one or more embodiments of the invention, the sparse virtual space sector is unlocked by updating the embedded metadata to specify that the sparse virtual space sector is no longer locked.

In one or more embodiments of the invention, the identified sector counter is further updated to specify that one more associated sparse virtual space segment is allocated and no longer available. This may result in the numerical value of the identified sector counter being increased by one. Further, as the identified sector counter is updated, the identified slice counter and the identified slice group counter are updated to reflect the new allocation.

Figure 19:
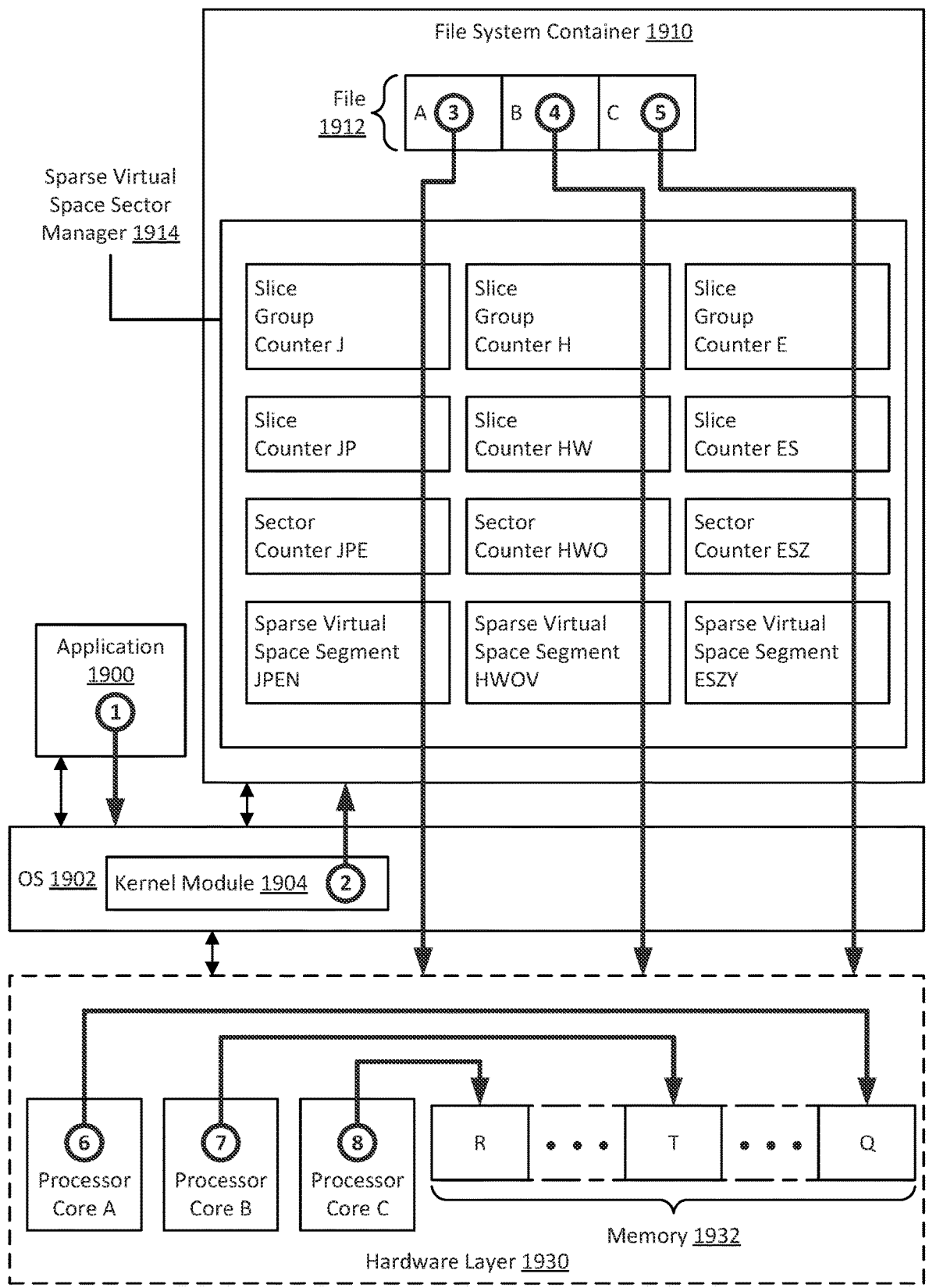
FIG. 19 shows an example in accordance with one or more embodiments of the invention.

FIG. 19 shows an example in accordance with one or more embodiments of the invention. The following use case is for explanatory purposes only and not intended to limit the scope to this embodiment.

In FIG. 19, consider a scenario in which, at (1), an application (1900) issues a request to write new data in memory. The new data may be a file with file segments A, B, and C. The request is sent to an OS (1902) on which the application is operating.

At (2), a kernel module (1904) operating on the OS (1902) forwards the request to a file system container (1910).

At (3), a sparse virtual space sector manager (1914) traverses an available space tracking metadata hierarchy via the method of FIG. 18 to identify a sparse virtual space segment of a sparse virtual space in which file segment A may be stored. Specifically, the sparse virtual space sector manager (1914) identifies a slice group counter J that indicates free space. The sparse virtual space sector manager (1914) further traverses the available space tracking metadata hierarchy to identify a slice counter JP that indicates free space. Continuing the traversal, the sparse virtual space sector manager (1914) identifies a sector counter JPE that indicates free space, locks the sector counter, identifies a sparse virtual space segment JPEN that is available for use for file segment A, associates the sparse virtual space segment with file segment A, and unlocks the sector counter.

Occurring concurrently with (3), at (4), a sparse virtual space sector manager (1914) traverses the available space tracking metadata hierarchy via the method of FIG. 18 to identify a sparse virtual space segment of the sparse virtual space in which file segment B may be stored. Specifically, and similarly to (3) the sparse virtual space sector manager (1914) identifies a slice group counter H that indicates free space. The sparse virtual space sector manager (1914) further traverses the available space tracking metadata hierarchy to identify a slice counter HW that indicates free space. Continuing the traversal, the sparse virtual space sector manager (1914) identifies a sector counter HWO that indicates free space, locks the sector counter, identifies a sparse virtual space segment HWOV that is available for use for file segment B, associates the sparse virtual space segment with file segment B, and unlocks the sector counter.

Occurring concurrently with (3), at (4), a sparse virtual space sector manager (1914) traverses the available space tracking metadata hierarchy via the method of FIG. 18 to identify a sparse virtual space segment of the sparse virtual space in which file segment B may be stored. Specifically, and similarly to (3) the sparse virtual space sector manager (1914) identifies a slice group counter H that indicates free space. The sparse virtual space sector manager (1914) further traverses the available space tracking metadata hierarchy to identify a slice counter HW that indicates free space. Continuing the traversal, the sparse virtual space sector manager (1914) identifies a sector counter HWO that indicates free space, locks the sector counter, identifies a sparse virtual space segment HWOV that is available for use for file segment B, associates the sparse virtual space segment with file segment B, and unlocks the sector counter.

Occurring concurrently with (3) and (4), at (5), a sparse virtual space sector manager (1914) traverses the available space tracking metadata hierarchy via the method of FIG. 18 to identify a sparse virtual space segment of the sparse virtual space in which file segment C may be stored. Specifically, and similarly to (3) and (4) the sparse virtual space sector manager (1914) identifies a slice group counter E that indicates free space. The sparse virtual space sector manager (1914) further traverses the available space tracking metadata hierarchy to identify a slice counter ES that indicates free space. Continuing the traversal, the sparse virtual space sector manager (1914) identifies a sector counter ESZ that indicates free space, locks the sector counter, identifies a sparse virtual space segment ESZY that is available for use for file segment C, associates the sparse virtual space segment with file segment C, and unlocks the sector counter. Though not shown in FIG. 19, each of the selected sparse virtual memory segments is associated with a corresponding memory segment, this information is used to program the MMU (not shown).

At (6), a processor core A of a hardware layer (1930) identifies, using the MMU (not shown), a physical memory segment Q in memory (1932) of the hardware layer (1930) associated with sparse virtual space segment JPEN. Processor core A subsequently writes the file segment A to physical memory segment Q.

At (7), processor core B identifies, using the MMU (not shown), physical memory segment T as associated with sparse virtual segment HWOV. Processor core B subsequently writes the file segment B to physical memory segment T.

At (8), processor core C identifies, using the MMU (not shown), physical memory segment R as associated with sparse virtual segment ESZY. Processor core C subsequently writes the file segment C to physical memory segment R.

One or more embodiments of the invention make it possible to seamlessly access memory and persistent storage using a single file system container. Accordingly, applications, accessing the data of persistent storage and memory, are not aware of the actual physical locations of the data being accessed and manipulated. Further, the file system container is configured to handle memory mapping requests for data in persistent storage. Thus, regardless of the physical location of the data, the file system container is able to service memory mapping requests and provide direct access to data by shifting the data, located in persistent storage, to memory without any additional action on behalf of the application.

Further, one or more embodiments of the invention enable a node to maintain parallel processing of data in a virtualized space by monitoring the allocation of virtual segments and the availability of the virtual segments and locking sectors associated with the virtual segments to prevent parallel processes from attempting to allocate to the same virtual segments at one time.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:
1. A method for processing requests, comprising:
receiving a request to write data;

in response to the request, identifying a sparse virtual space segment using an available space tracking metadata hierarchy; and initiating writing of the data to a physical segment, wherein the physical segment is associated with the sparse virtual space segment, wherein the available space tracking metadata hierarchy tracks allocation of a plurality of sparse virtual space segments using a plurality of counters that provide a numerical value that specifies a number of sparse virtual space segments that are available, wherein a first value of a first counter is based on at least a second value of a second counter and a third value of a third counter, wherein the first counter is associated at a first level in the available space tracking metadata hierarchy, wherein the second counter and the third counter are associated with a second level in the available space tracking metadata hierarchy, wherein the second level is below the first level in the available space tracking metadata hierarchy, wherein the first counter is a slice group counter, wherein the second counter is a sector counter or a slice counter;

wherein identifying the sparse virtual space segment using the available space tracking metadata hierarchy comprises:

traversing the available space tracking metadata hierarchy to a sector counter that is associated with at least one unallocated sparse virtual space segment wherein traversing the available space tracking metadata hierarchy comprises selecting a slice group counter of a plurality of slice group counters to initiate the traversal;

determining that a sparse virtual space sector associated with the sector counter is unlocked, wherein the sparse virtual space segment is located within the sparse virtual space sector; and in response to the determination, locking the sparse virtual space sector.

2. The method of claim 1, wherein each counter of the plurality of counters is one selected from a group consisting of a segment counter, sector counter, a slice counter, and a slice group counter.

3. The method of claim 1, wherein the physical segment is a memory segment.

4. The method of claim 3, wherein the memory segment is a segment of Persistent Memory (PMem).

5. The method of claim 1, further comprising:
unlocking the sparse virtual space sector after the writing of the data to the physical segment is complete.

6. The method of claim 1, wherein the slice group counter is randomly selected from the plurality of slice group counters.

7. A non-transitory computer readable medium comprising instructions which, when executed by a computer processor, enables the computer processor to perform a method for processing requests, the method comprising:

receiving a request to write data;

in response to the request, identifying a sparse virtual space segment using an available space tracking metadata hierarchy; and initiating writing of the data to a physical segment, wherein the physical segment is associated with the sparse virtual space segment, wherein the available space tracking metadata hierarchy tracks allocation of a plurality of sparse virtual space segments using a plurality of counters that provide a numerical value that specifies a number of sparse virtual space segments that are available, wherein a first value of a first counter is based on at least a second value of a second counter and a third value of a third counter, wherein the first counter is associated at a first level in the available space tracking metadata hierarchy, wherein the second counter and the third counter are associated with a second level in the available space tracking metadata hierarchy, wherein the second level is below the first level in the available space tracking metadata hierarchy, wherein the first counter is a slice group counter, wherein the second counter is a sector counter or a slice counter;

wherein identifying the sparse virtual space segment using the available space tracking metadata hierarchy comprises:

traversing the available space tracking metadata hierarchy to a sector counter that is associated with at least one unallocated sparse virtual space segment wherein traversing the available space tracking metadata hierarchy comprises selecting a slice group counter of a plurality of slice group counters to initiate the traversal;

determining that a sparse virtual space sector associated with the sector counter is unlocked, wherein the sparse virtual space segment is located within the sparse virtual space sector; and in response to the determination, locking the sparse virtual space sector.

8. The non-transitory computer readable medium of claim 7, wherein each counter of the plurality of counters is one selected from a group consisting of a segment counter, sector counter, a slice counter, and a slice group counter.

9. The non-transitory computer readable medium of claim 7, wherein the physical segment is a segment of Persistent Memory (PMem).

10. The non-transitory computer readable medium of claim 7, wherein the segment is one of a plurality of memory segments of Persistent Memory (PMem).

* * * * *